United States Patent
Itami et al.

(10) Patent No.: US 6,281,609 B1
(45) Date of Patent: *Aug. 28, 2001

(54) DIRECT-CURRENT BRUSHLESS MOTOR, AND POLYGON SCANNER AND IMAGE FORMING APPARATUS HAVING THE SAME AND A METHOD THEREOF

(75) Inventors: Yukio Itami; Mitsuo Suzuki, both of Yokohama (JP)

(73) Assignee: Ricoh Company, Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/321,886

(22) Filed: May 28, 1999

(30) Foreign Application Priority Data

May 29, 1998 (JP) .................................. 10-149065
Jul. 17, 1998 (JP) .................................. 10-203614

(51) Int. Cl.$^7$ .......................... H02K 11/00; H02K 21/12
(52) U.S. Cl. ....................... 310/68 B; 310/156; 310/179; 310/184; 310/198
(58) Field of Search ................... 310/68 B, 156, 310/90, 179, 180, 184, 191, 198, 162, 256, 259, 267

(56) References Cited

U.S. PATENT DOCUMENTS

| | | | |
|---|---|---|---|
| 2,397,183 | * 3/1946 | Kilgore et al. | 310/179 |
| 2,575,716 | * 11/1951 | Kilgore | 310/179 |
| 4,739,203 | * 4/1988 | Miyao et al. | 310/67 R |
| 4,847,526 | * 7/1989 | Takehara et al. | 310/185 |
| 4,882,524 | * 11/1989 | Lee | 318/254 |
| 4,965,476 | * 10/1990 | Lin | 310/51 |
| 5,097,164 | * 3/1992 | Nakasugi et al. | 310/88 |
| 5,164,622 | * 11/1992 | Kordik | 310/67 R |
| 5,189,354 | * 2/1993 | Tominaga et al. | 318/671 |
| 5,847,479 | * 12/1998 | Wang et al. | 310/90 |
| 5,962,944 | * 10/1999 | Narita et al. | 310/156 |
| 5,982,067 | * 11/1999 | Sebastian et al. | 310/184 |
| 6,034,460 | * 3/2000 | Tajima et al. | 310/179 |

FOREIGN PATENT DOCUMENTS

| | | |
|---|---|---|
| 8-149775 | 6/1996 | (JP) . |
| 11-38346 | 2/1999 | (JP) . |

* cited by examiner

*Primary Examiner*—Nestor Ramirez
*Assistant Examiner*—Dang Dinh Le
(74) *Attorney, Agent, or Firm*—Oblon, Spivak, McClelland, Maier & Neustadt, P.C.

(57) ABSTRACT

A direct-current (DC) brushless motor is provided for realizing an easy winding operation, a flat shape, effective utilization of a magnetic force, improved magnetic characteristics of a stator core, and a good rotation driving efficiency particularly at a higher rotational speed region. The DC brushless motor switches conduction to windings wound around a stator core fixedly disposed corresponding to a rotatable rotor on which a permanent magnet is fixed, to generate a rotating magnetic field which causes the rotor to rotate. The DC brushless motor includes a permanent magnet having n magnetized poles, where n is an even number, a rotatably held rotor on which the permanent magnet is fixed, a stator core having T-shaped pole shoes corresponding to the magnetic poles of the permanent magnet, windings fixed on the stator core and including a plurality of phases for selectively generating magnetic polarities in sequence, a driver circuit for switching conduction to the windings, and a rotating position detector for detecting a rotating position of the permanent magnet. The windings are divided into a plurality of winding groups for generating magnetic polarities in a plurality of the windings so as to produce a magnetic repellent force or a magnetic attractive force between all the magnetic poles of the permanent magnet and T-shaped pole shoes of the stator core associated with selected phases by the driver circuit based on a rotating position detected by the rotating position detector.

27 Claims, 33 Drawing Sheets

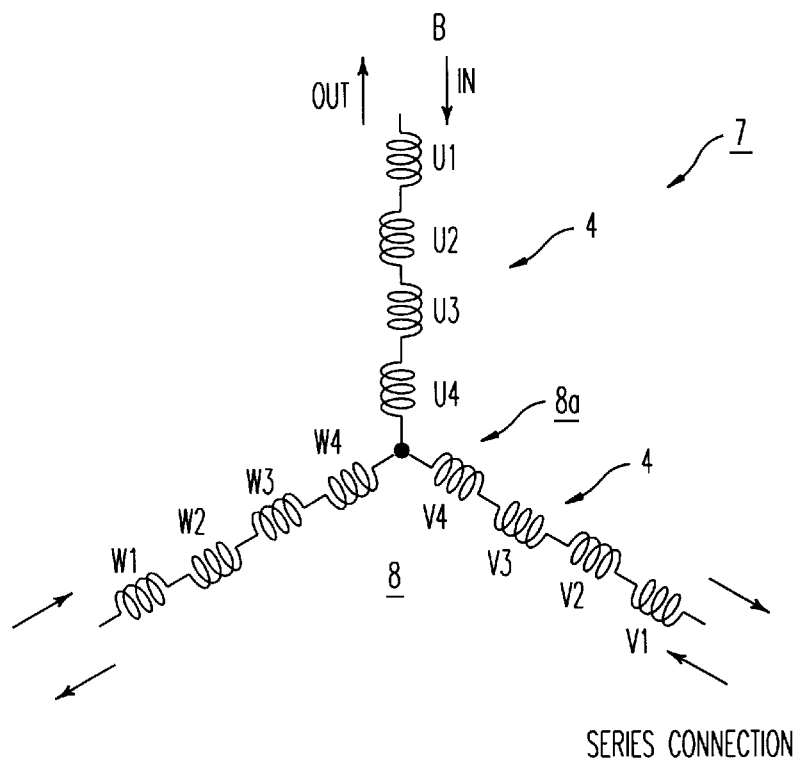
FIG. 9A — SERIES CONNECTION
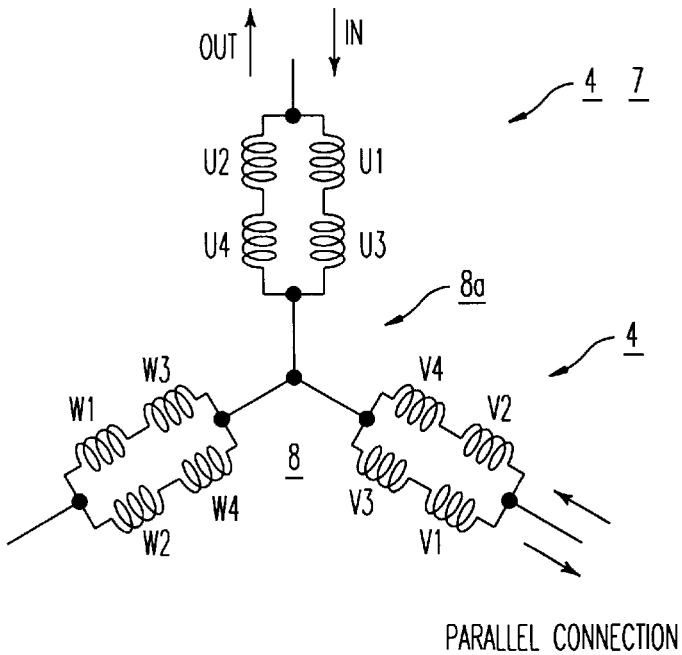
FIG. 9B — PARALLEL CONNECTION

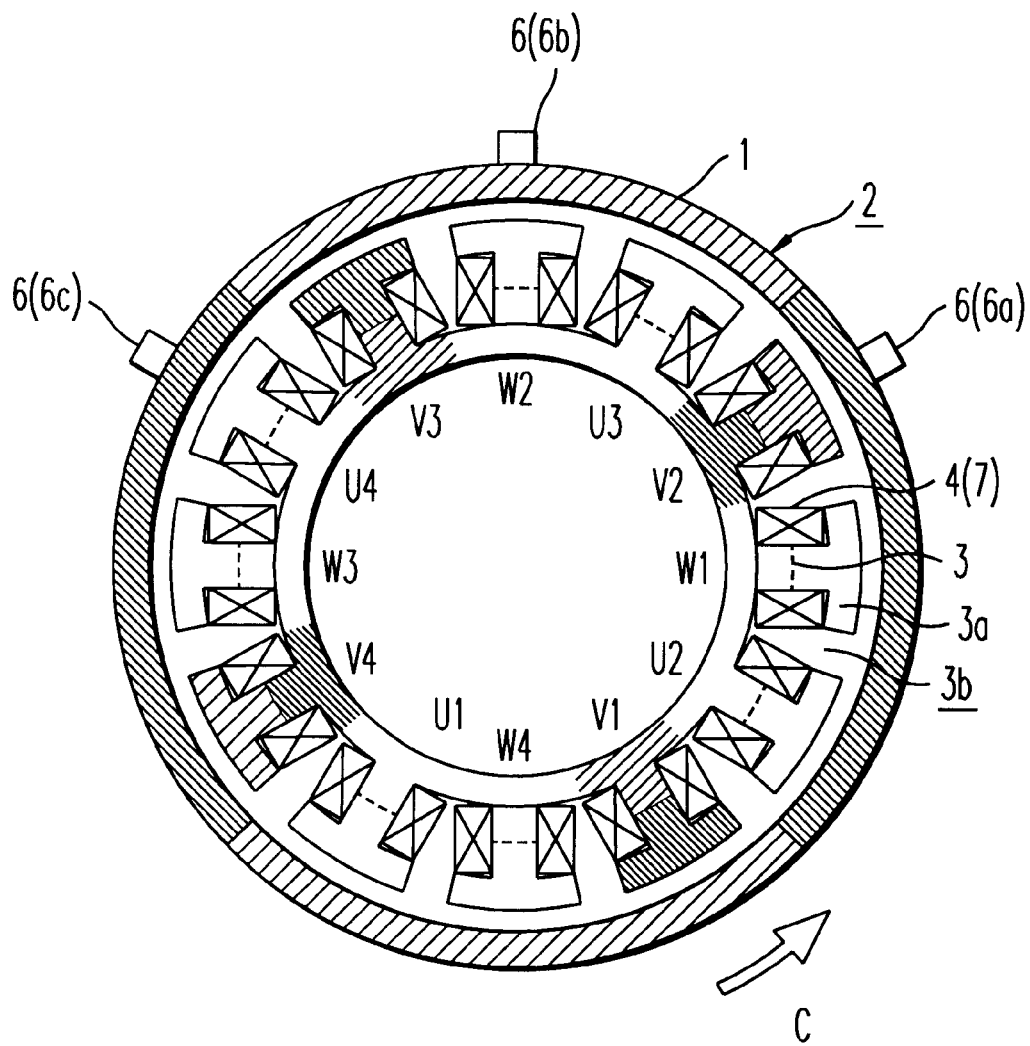
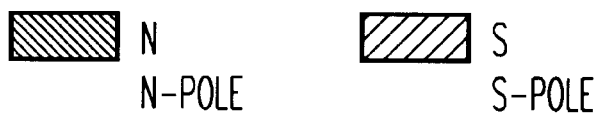
FIG. 12

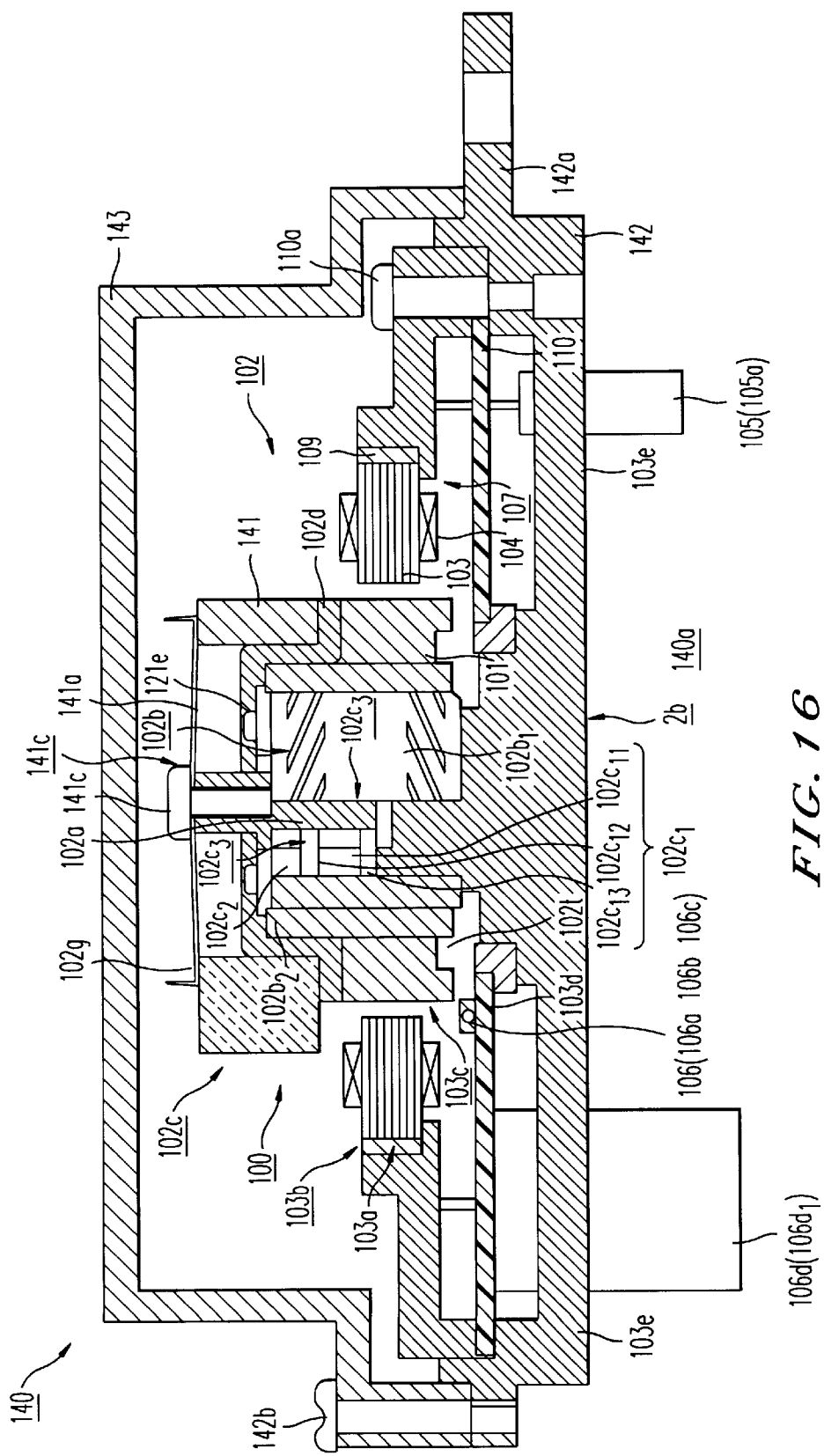

DIRECT-CURRENT BRUSHLESS MOTOR, AND POLYGON SCANNER AND IMAGE FORMING APPARATUS HAVING THE SAME AND A METHOD THEREOF

BACKGROUND OF THE INVENTION

1. Field of the Invention

The present invention relates generally to a direct-current (DC) brushless motor, and a polygon scanner and an image forming apparatus having the same, and more particularly to a DC brushless motor which rotates a rotor by generating a rotating magnetic field while switching conduction to windings fixed on a stator core securely disposed in correspondence to the rotatable rotor having permanent magnets fixed thereon, a polygon scanner which has the DC brushless motor for rotating a rotating body having a polygon mirror fixed thereon to scan a laser beam for writing data, and an image forming apparatus for writing an image carrier or a photosensitive drum through a laser beam to form an image on the image carrier in an electrophotographic system. The present invention has particular applications in electrophotographic image forming apparatus suitable for a copying machine, a printer, a facsimile machine, a combination of these machines, or the like.

2. Discussion of the Background

Electrophotographic image forming apparatus employing a laser writing system for use in a digital copying machine, a laser printer, a facsimile apparatus, a combination of these machine, or the like have become rapidly more pervasive because of their high performance including a high printing quality, high speed printing capability, low noise and so on, as well as because of a reduction in price. A polygon scanner, which is a component of the laser writing system for these machines, is required to have the capability of rotating at an appropriate rotational speed corresponding to an image forming speed and a pixel density of the higher performance image forming apparatus.

Particularly, with an increasingly higher image forming speed and pixel density, the polygon scanner in the laser writing system is required to provide a high rotational speed exceeding 20,000 revolutions per minute, so that some conventional polygon scanners of a ball bearing type are not sufficient to satisfy a required quality in regard to an effective life of bearings, noise caused by the bearings, or the like.

For this reason, a polygon scanner employing a dynamic pressure air bearing has been proposed for higher rotational speeds by the same inventors as the present application (see for example Laid-open Japanese Patent Application No. 11-38346).

With such a polygon scanner having the capability of rotating at a higher rotational speed, power consumption is increased as the rotational speed is higher. Since a difference in efficiency between employed motors as driving power sources for polygon scanners noticeably appears in the difference in power consumption between the motors, a reduction in power consumption through an improvement in motor efficiency has been a critical issue.

For example, a DC brushless motor of a so-called radial gap inner rotor type is known (see Laid-open Japanese Patent Application No. 8-149775). Specifically, this type of DC brushless motor is composed of a rotor having permanent magnets fixed thereon, a stator core disposed outside the rotor with a predetermined spacing therebetween, a plurality of windings wound around the stator cores, and so on. A rotating magnetic field is generated by switching conduction to the windings to rotate the rotor.

Conventionally known stator cores used in DC brushless motors of this type may be classified into an open slot type, a half-open slot type, and a closed slot type. The open slot type stator rotor is described, for example, in Kokichi Ohkawa "Permanent Magnet Motor," p185, published by Sogo Denshi Shuppan, 1975.

Since the closed slot type involves difficulties in a winding method and hence a higher manufacturing cost, the open slot type and the half-open slot type are generally considered more convenient due to their relatively easy winding operations.

In recent years, however, there is a tendency of preferentially manufacturing DC brushless motors of a so-called radial gap outer rotor type, which provide a higher production efficiency in a winding operation step than the radial gap inner rotors that employ the open slot type or half-open slot type stator rotor.

This is because the stator rotor used in the radial gap outer rotor type DC brushless motor has an open slot formed in an outer peripheral portion so that winding can be made more easily than the radial gap inner rotor type, which has an open slot in an inner peripheral portion.

In recent years, DC brushless motors of the radial gap outer rotor type have been widespread, and accordingly, a manufacturing cost thereof has been also reduced.

U.S. Pat. No. 5,382,853 discloses such a DC brushless motor of the radial gap outer rotor type, which includes a permanent magnet having four magnetized poles, six pole shoes and six windings.

Referring now to FIG. 1, which illustrates a conventional DC brushless motor 200, a permanent magnet 201 has four poles formed of two pairs of two polarities, and is rotatably supported by a rotor 202. A stator core 203 is disposed inside the permanent magnet 201 concentrically therewith.

The stator core 203, made of a ferromagnetic material, is formed with six T-shaped pole shoes 203a, each of which is wound with a winding 204. That is, six windings 204 are wound around the six pole shoes 203a.

The windings 204 include three phases designated as a U-phase, a V-phase and a W-phase in FIG. 1, where a set of two windings U1, U2 form the U-phase; a set of two windings V1, V2 form the V-phase; and a set of two windings W1, W2 form the W-phase.

A rotating position detecting mechanism 206 includes three rotating position detector elements 206a, 206b, 206c disposed at intervals of 60°, which generate rotating position detecting signals that are used by a driver circuit 205 (see FIG. 3) to switch conduction such that two phases are selected for conduction.

When the three rotating position detector elements 206a, 206b, 206c of the rotating position detecting mechanism 206 detect N, S, N poles, respectively, two phases, U-phase and V-phase, are selected and energized.

A current flows into the windings from the U1-phase and out of the V1-phase, causing the T-shaped pole shoe 203a wound with the U1-phase and U2-phase to have the S-polarity; and the T-shaped pole shoe 203a wound with the V1-phase and V2-phase to have the N-polarity. Consequently, a magnetic repellent force or a magnetic attractive force acts between the permanent magnet 201 and the stator core 203 to rotate the permanent magnet 201 in the counter-clockwise direction as indicated by an arrow A in FIG. 1.

Referring now to FIG. 2 to explain how the windings 204 are wound around the respective pole shoes 203a. Viewed from the permanent magnet 201, U1 and U2 in the U-phase of the winding 204 are wound in the same direction and connected to each other such that a current conducted therethrough causes the T-shaped shoe poles 203a, wound with windings U1, U2, to have the same magnetic polarity (see again FIG. 1).

Similarly, V1 and V2 in the V-phase of the winding 204 and W1 and W2 in the W-phase of the winding 204 are wound in the same direction and connected to each other.

Referring next to FIG. 3, three winding groups 207 including the three sets of U-phase, V-phase, and W-phase windings 204 are connected in a Y-shaped connection configuration as generally indicated by reference numeral 208. Each of the three U-phase, V-phase, and W-phase windings 204 in the groups 207 has one end connected to an associated driver circuit 205, which switches the phases of the conducted windings 204 in accordance with rotating position detecting signals of the rotating position detecting mechanism 206, not shown in FIG. 3.

Referring next to FIG. 4, a description will be made on how the conduction is switched on the basis of a rotating position a detection made by the three rotating position detector elements 206a, 206b, 206c of the rotating position detecting mechanism 206 and the driver circuits 205 (FIG. 3) in response to the rotating position detection, as well as on a rotating magnetic field generated corresponding to switched conduction and the rotation induced by the rotating magnetic field of the rotor 202 having the permanent magnet 201 fixed thereon.

Specifically, FIG. 4 shows that the phases subjected to conduction are switched every 300 to generate a rotating magnetic field which causes the rotor 202 having the permanent magnet 201 fixed thereon to rotate in the counter-clockwise direction as indicated by an arrow A in FIG. 1.

As the rotor 202 is rotated over an angular distance of 180°, the conduction is switched six times by the driver circuits 205, shown in FIG. 3, so that the conduction is switched twelve times during a full rotation of the rotor 202.

In the conventional DC brushless motor, as well as a polygon scanner and an image forming apparatus employing this DC brushless motor, however, magnetic circuits passing through the stator core are formed between the U1-phase and V1-phase windings and between the U2-phase and V2-phase windings of the DC brushless motor, respectively. Therefore, magnetic flux concentrates on two regions around the magnetic circuits, so that driving torques acting on the permanent magnets fixed on the rotor also concentrate on the two regions, thereby limiting effective utilization of magnetic forces generated by the permanent magnet over the entire periphery of the rotor. Particularly, the DC brushless motor suffers from a low rotation driving efficiency at a higher rotational speed due to an air flow loss, a switching loss, and so on, so that the DC brushless motor disadvantageously requires a high power consumption and a large size to compensate for the low efficiency.

SUMMARY OF THE INVENTION

The present invention has been made to solve the problems as mentioned above. In particular, it is an object of the present invention to provide a small direct-current brushless motor which is capable of realizing a variety of operational improvements including: an easy winding operation; a flat shape; effective utilization of a magnetic force generated by a permanent magnet fixed on the rotor over the entire periphery thereof; improved magnetic characteristics of a stator core; and a good rotation driving efficiency particularly at a higher rotational speed region.

It is another object of the present invention to provide a polygon scanner and an image forming apparatus which employ the improved direct-current brushless motor as described above.

To achieve the above and other objects, the present invention provides a direct-current brushless motor for switching conduction to windings wound around a stator core fixedly disposed corresponding to a rotatable rotor on which a permanent magnet is fixed, to generate a rotating magnetic field which causes the rotor to rotate. The direct-current brushless motor includes a permanent magnet having n magnetized poles, where n is an even number, a rotatably held rotor on which the permanent magnet is fixed, a stator core having T-shaped pole shoes corresponding to the magnetic poles of the permanent magnet, windings fixed on the stator core and including a plurality of phases for selectively generating magnetic polarities in sequence, a driver circuit for switching conduction to the windings, and a rotating position detecting mechanism for detecting a rotating position of the permanent magnet. The windings are divided into a plurality of winding groups for generating magnetic polarities in a plurality of the windings so as to produce a magnetic repellent force or a magnetic attractive force between all of the magnetic poles of the permanent magnet and T-shaped pole shoes of the stator core associated with selected phases by the driver circuit based on a rotating position detected by the rotating position detecting mechanism.

In addition, the stator core may include open slots formed between the T-shaped pole shoes on the outer periphery. The plurality of winding groups may include the number n of windings per phase, and are disposed on the circumference at equal intervals, corresponding to the phases being connected in a Y-shaped connection configuration. Adjacent windings in each of the phases are wound such that opposite polarities occur in alternation when a current flows therethrough. Thus, a current flowing into the winding groups from a common connection point of the Y-shaped connection configuration causes opposite polarities to occur in adjacent windings.

More specifically, the plurality of winding groups may include four windings per phase, and are disposed on the circumference at equal intervals, corresponding to the phases being connected in a Y-shaped connection configuration. Adjacent windings in each of the phases are wound such that opposite polarities occur in alternation when a current flows therethrough. Thus, a current flowing into the winding groups from a common connection point of the Y-shaped connection configuration causes opposite polarities to occur in adjacent windings.

The rotor may have an integrally fixed shaft radially and axially rotatably supported by a radial dynamic pressure air bearing and an axial bearing.

The permanent magnet fixed on the rotor may be disposed in a circumferential direction of the stator core. Alternatively, the permanent magnet fixed on the rotor may be disposed outside or inside the stator core.

Also, the stator core may be formed with a cylindrical inner surface opposite to the permanent magnet.

The direct current brushless motor may further include an annular member made of a ferromagnetic material and disposed along the outer periphery of the windings.

The driver circuit may selectively conduct windings in one or two of three phases of the winding groups to generate a rotating magnetic field, which causes the rotor to rotate.

In another aspect, the present invention provides a polygon scanner for driving a rotating body having a polygon mirror fixed thereon to scan a writing beam. The polygon scanner includes a polygon mirror, a rotor having the polygon mirror fixed thereon, and the foregoing direct-current brushless motor.

In a further aspect, the present invention provides an image forming apparatus for irradiating laser onto a photosensitive image carrier to write data thereon in an electrophotographic system. The image forming apparatus includes a rotatably held photosensitive image carrier, a charging mechanism for uniformly charging a surface of the image carrier, an exposing mechanism for irradiating laser onto the surface of the image carrier charged by the charging mechanism to form a latent image on the surface. The exposing mechanism includes the foregoing polygon scanner equipped with the direct-current brushless motor. Also included is a developing mechanism for developing the latent image formed by the exposing mechanism.

In the direct-current brushless motor of the present invention, a magnetic repellent force or a magnetic attractive force is produced between all of the magnetic poles of the permanent magnet and the T-shaped pole shoes of the stator core associated with selected phases by the driving mechanism based on a rotating position detected by the rotating position detecting mechanism, thereby making it possible to effectively utilize the magnetic force of the permanent magnet over the entire periphery, to improve the rotation driving efficiency at higher rotational speeds, and to reduce power consumption and the size of the direct-current brushless motor.

Also, the open slots formed between the T-shaped pole shoes on the outer periphery of the stator core facilitate a winding operation and hence contribute to a reduction in cost caused.

Specifically, the plurality of winding groups include n windings per phase, and are disposed around the circumference at equal intervals, where the winding groups corresponding to the phases are connected in a Y-shaped connection configuration. Adjacent windings in each of the phases are wound such that opposite polarities occur in alternation when a current flows therethrough. A current flowing into the winding groups from a common connection point of the Y-shaped connection configuration causes opposite polarities to occur in mutually adjacent windings. Consequently, the direct-current brushless motor of the present invention is advantageous in effectively utilizing the magnetic force of the permanent magnet over the entire periphery, improving the rotation driving efficiency at a high rotational speed, reducing power consumption, and reducing the size of the direct-current brushless motor. More specifically, the number of windings per phase may be four in the plurality of winding groups.

Further, the rotor may have an integrally fixed shaft which is radially and axially rotatably supported by a radial dynamic pressure air bearing and an axial bearing.

The permanent magnet fixed on the rotor may be disposed in a circumferential direction of the stator core. Alternatively, the permanent magnet fixed on the rotor is disposed outside or inside the stator core. The structure of the permanent magnet as mentioned contributes to a flat shape of the direct-current brushless motor and reduced vibrations of the rotor.

The stator core may be formed with a cylindrical inner surface opposite to the permanent magnet, thereby facilitating a winding operation and contributing to a reduction in cost.

The direct-current brushless motor may further include an annular member made of a ferromagnetic material extending along the outer periphery of the windings. With the annular member, the direct-current brushless motor can further improve the magnetic characteristic of the stator core, and hence more effectively utilize a magnetic force of the permanent magnet.

The driver circuit may selectively conduct windings in one or two of three phases of the winding groups to generate a rotating magnetic field which causes the rotor to rotate, thereby further improving the utilization factor of a magnetic force of the permanent magnet, which results in more effective utilization of the magnetic force over the entire periphery, a higher rotation driving efficiency at high rotational speeds, and more reduced power consumption.

In the polygon scanner according to the present invention, the rotor on which the polygon mirror is fixed, is rotated by the direct-current brushless motor of the present invention, so that the polygon scanner can provide a variety of advantages described above.

In the image forming apparatus according to the present invention, the surface of the rotatably held image carrier is uniformly charged by the charging mechanism, and laser writing is performed by the exposing mechanism equipped with the direct-current brushless motor and the polygon scanner of the present invention to form a latent image, which is developed by the developing mechanism to form an actual image, so that the image forming apparatus can also provide a variety of advantages described above.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 9A and 9B illustrate Y-shaped connection configurations of the DC brushless motor of FIG. 5;

FIG. 12 is a cross-sectional view illustrating a main portion of a DC brushless motor according to another embodiment of the present invention;

FIG. 16 is a longitudinal sectional view illustrating a DC brushless motor according to another embodiment of the present invention;

DETAILED DESCRIPTION OF THE PREFERRED EMBODIMENT

Figure 1:
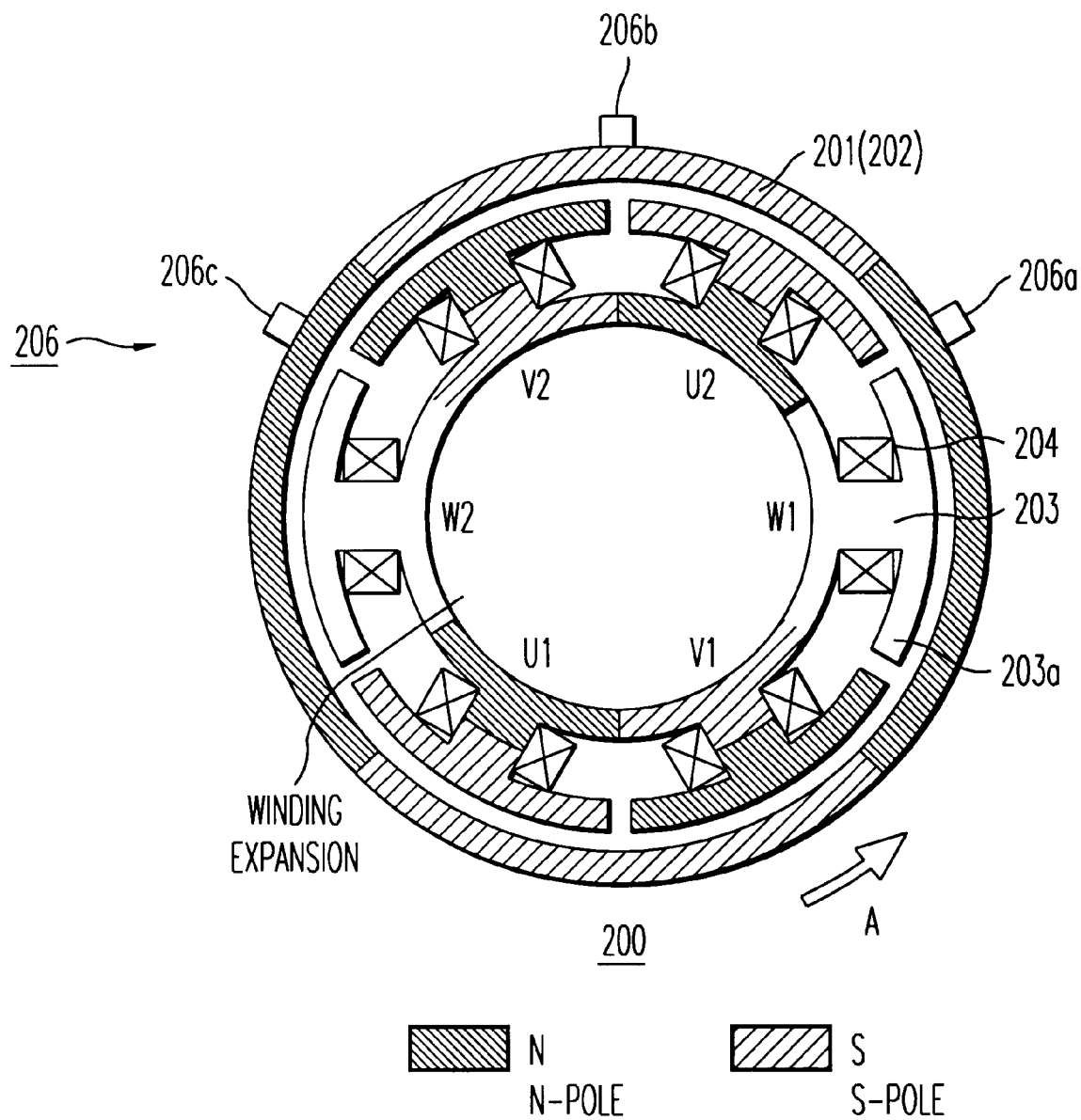
FIG. 1 is a cross-sectional view illustrating a main portion of a conventional direct-current (DC) brushless motor.
Figure 2:
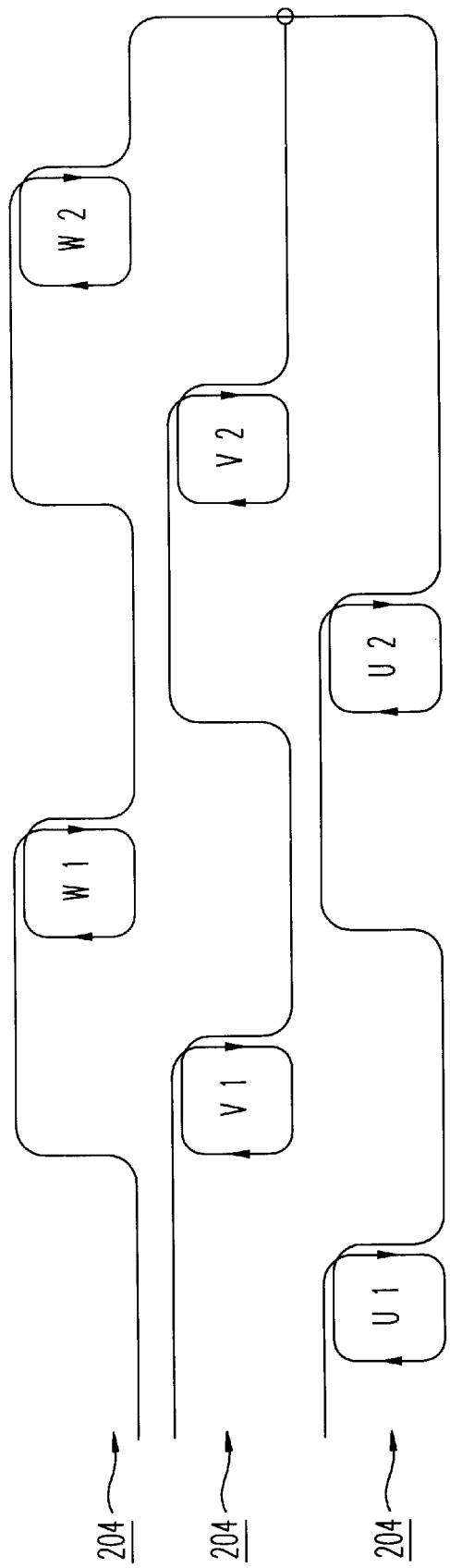
FIG. 2 is a schematic diagram for explaining how windings are wound around respective pole shoes in the conventional DC brushless motor.
Figure 3:
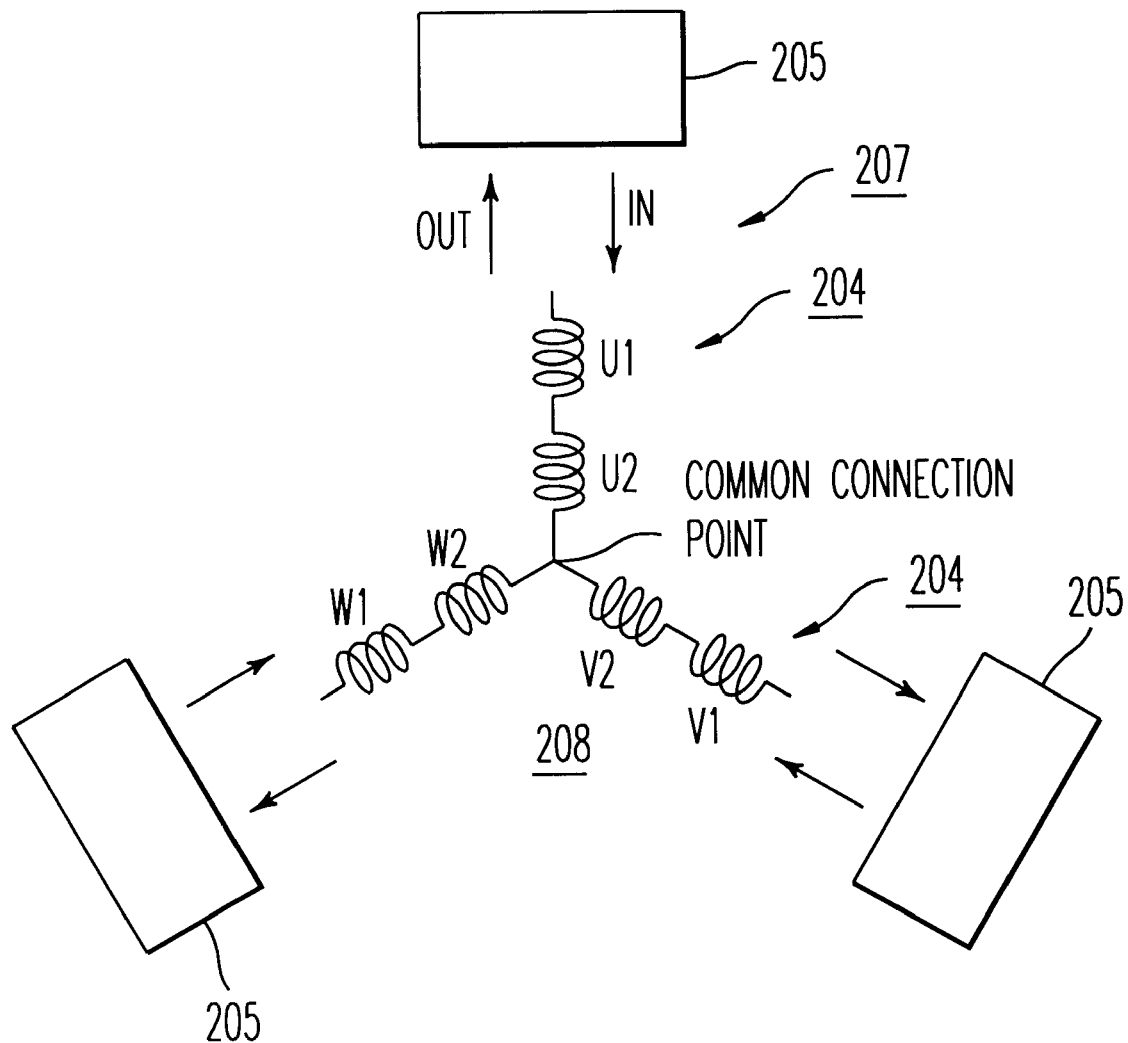
FIG. 3 illustrates a Y-shaped connection configuration of the conventional DC brushless motor.
Figure 4A:
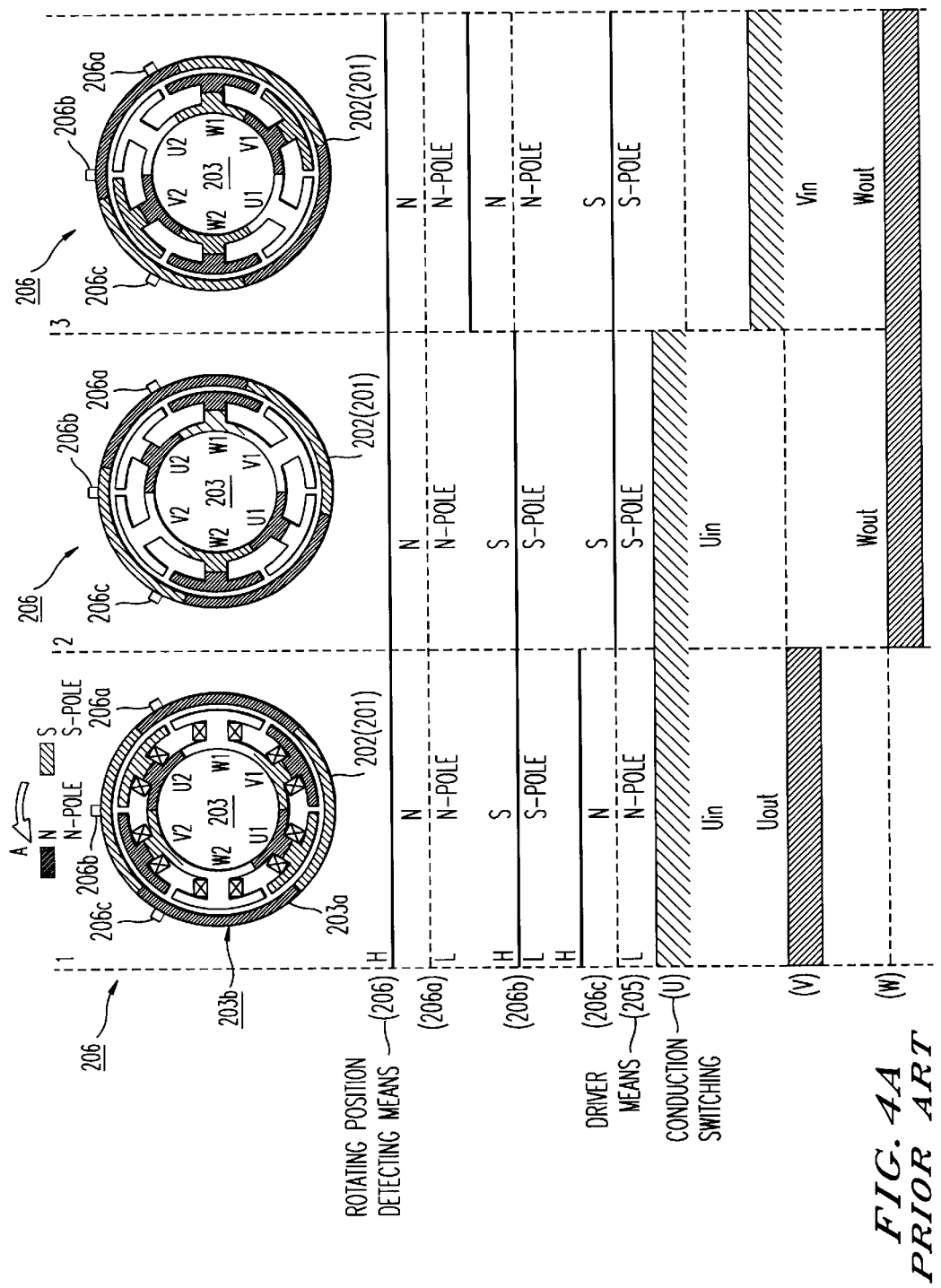
FIG. 4 shows how the conduction is switched to generate a rotating magnetic field.
Figure 4B:
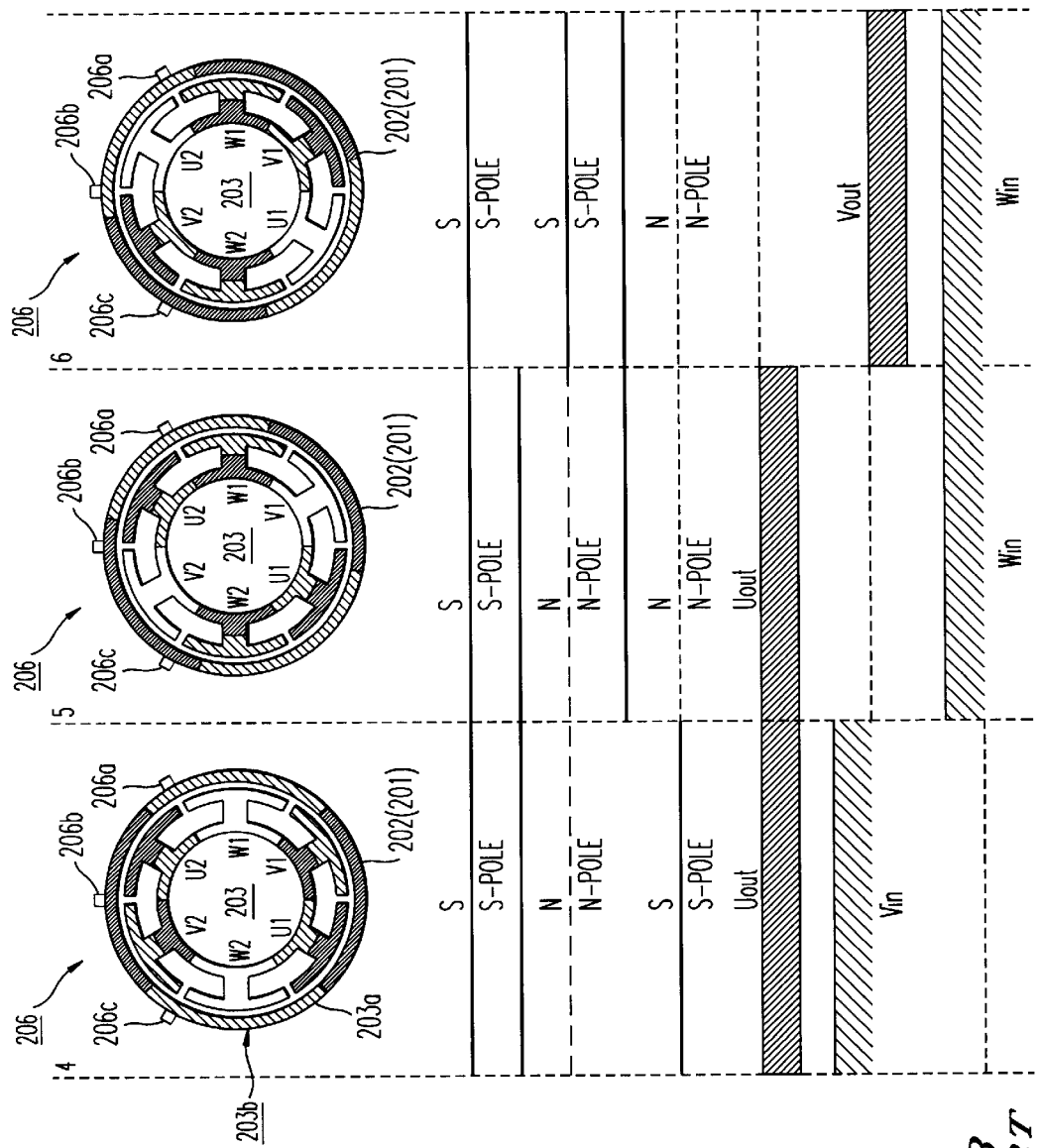

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Figure 5:
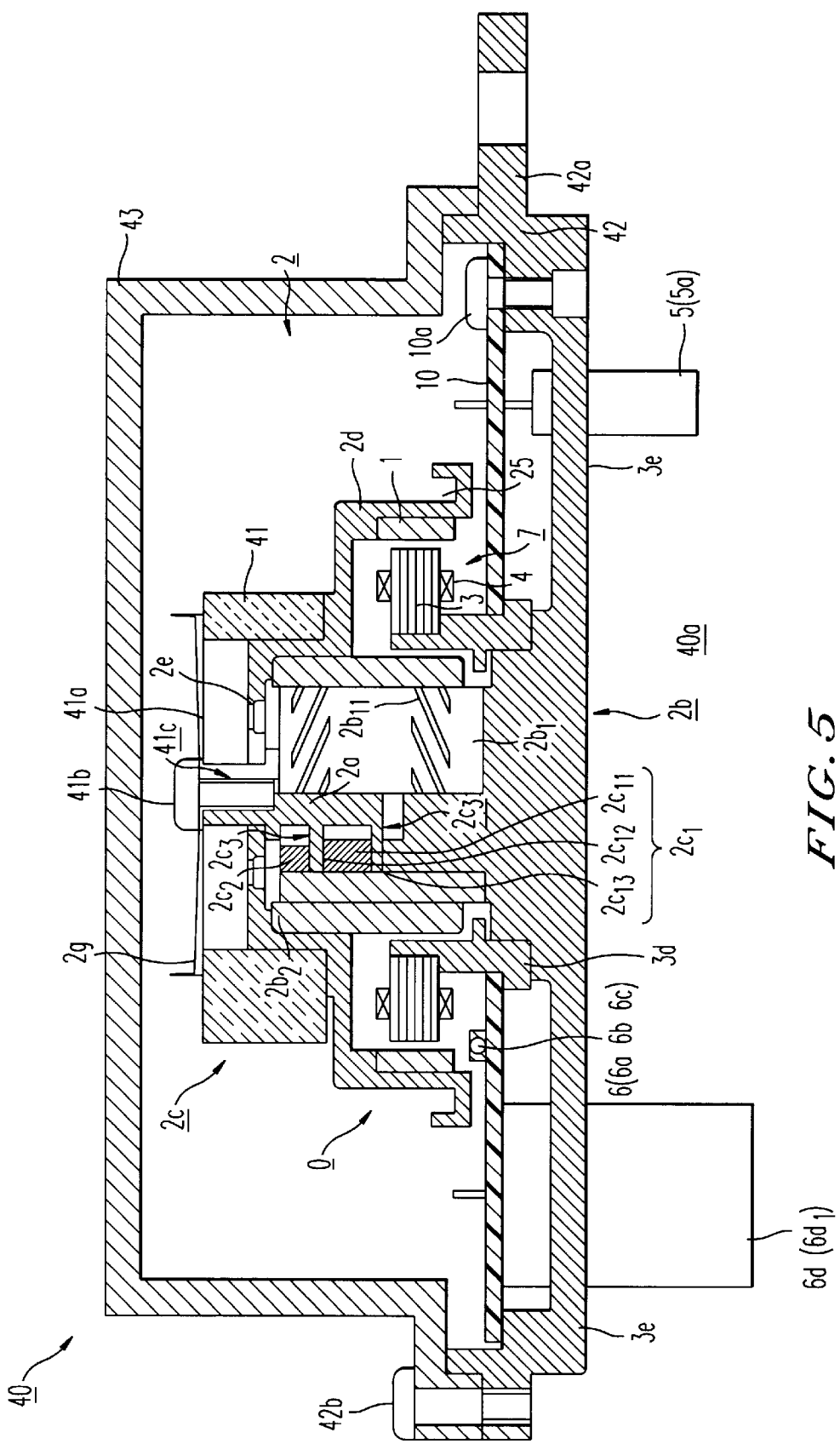
FIG. 5 is a longitudinal sectional view illustrating a DC brushless motor according to one embodiment of the present invention.
Figure 6:
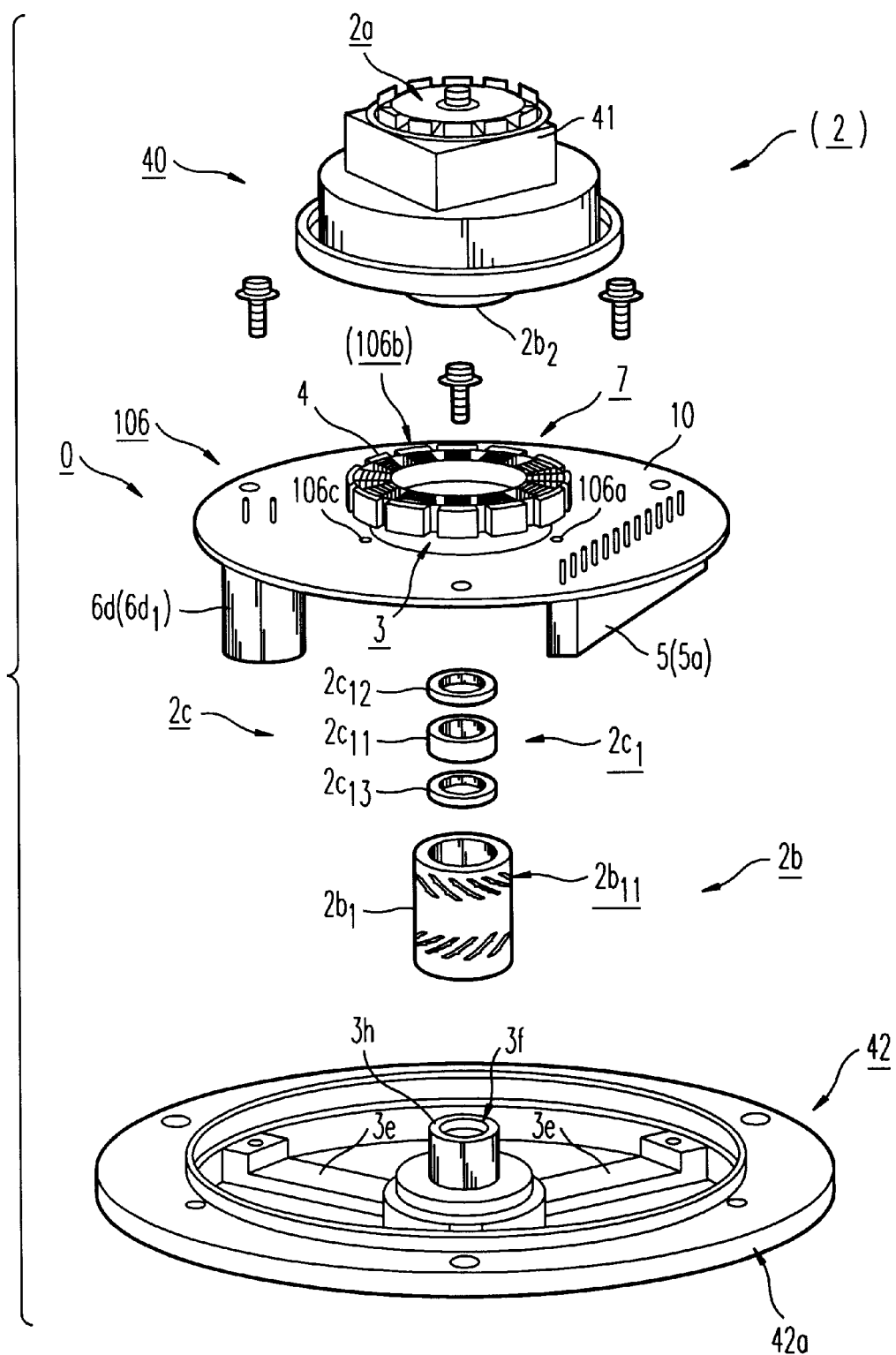
FIG. 6 is an exploded perspective view illustrating a main portion of the DC brushless motor of FIG. 5.

Referring now to the drawings, wherein like reference numerals designate identical or corresponding parts throughout the several views, and more particularly to FIGS. 5 and 6, a direct-current (DC) brushless motor 0 is illustrated in a cross-sectional view and an exploded perspective view, respectively. Generally, the DC brushless motor 0 is of a radial gap outer rotor type which has a rotor 2 with a permanent magnet 1 fixed thereon, and a stator core 3 wound with windings 4 outside of and concentrically with the rotor 2. Specifically, the rotor 2 has the permanent magnet 1 with an even-number n of magnetized poles fixed thereon and held rotatable therewith. The stator core 3 corresponds to the magnetic poles of the permanent magnet 1 fixed on the rotor 2. The windings 4, fixedly wound around the stator core 3, include a plurality of phases for selectively generating magnetic polarities in sequence. A driver circuit 5 switches conduction to the windings 4. A rotating position detecting mechanism 6 detects the rotating position of the permanent magnet 1 fixed on the rotor 2. A plurality of winding groups 7 generate magnetic polarities in the plurality of windings 4 so as to generate a magnetic repellent force or a magnetic attractive force by the driver circuit 5 between all the magnetic poles of the permanent magnet 1 and magnetic poles of selected phases on the stator core 3 based on a rotating position detected by the rotating position detecting mechanism 6.

A polygon scanner 40 includes the DC brushless motor 0; a polygon mirror 41 fixed on the rotor 2 of the DC brushless motor 0; a housing 42; and so on.

The housing 42 is protrusively formed with a reference surface 42a for mounting to an optical housing, not shown. The housing 42 contains a printed circuit board 10, forming part of the DC brushless motor 0, which is fixed with a screw 10a or an adhesive, not shown.

Mounted on the printed circuit board 10 are the stator core 3, made of a ferromagnetic material, wound with the windings 4; and three rotating position detector elements 6a, 6b, 6c forming part of the rotating position detecting mechanism 6, each including a hole element. Although not shown, the printed circuit board 10 is also formed with a wiring pattern for connecting these components to the driver circuit 5, a position detector circuit of the rotating position detecting mechanism 6, and other circuits 6d.

The printed circuit board 10 closely contacts the housing 42 along the circumference and closely contacts a base $3d$ of the stator core 3 in an inner peripheral portion. The base $3d$ also closely contacts the housing 42, which cooperates with a cover 43 to isolate from the outside a closed space in which the rotor 2 and the polygon mirror 41 fixed on the rotor 2 are accommodated.

At the center of the housing 42 is a cylindrical bearing mount reference $3f$, which is joined to and integrally machined with a plurality of beams $3e$ extending radially from the outer periphery of the housing 42. A fixed shaft $2b_1$ made of a non-magnetic material and forming part of a radial dynamic pressure air bearing $2b$ is adhesively fixed on a central portion of the housing 42 with reference to a reference surface $3g$.

The cylindrical surface of the fixed shaft $2b_1$ is formed with herringbone groves $2b_{11}$ for constituting the radial dynamic pressure air bearing $2b$. As the rotor 2 starts rotating, air pressure becomes high in a gap between a hollow rotating shaft $2b_2$ and the fixed shaft $2b_1$ to form a dynamic pressure air bearing, which supports the rotor 2 in a non-contacting manner in a radial direction.

An axial bearing $2c$, which may be an attractive magnetic bearing, has a fixing portion $2c_1$ embedded inside the fixed shaft $2b_1$ with reference to an end surface $3_h$ of the cylindrical bearing mount reference $3f$ formed at the center of the housing 42.

The fixing portion $2c_1$ includes an annular magnet $2_{c11}$, which is a permanent magnet made mainly of a rear earth based material and has two poles magnetized in the direction of the fixed shaft $2a$ fixed on the rotor 2; a first fixing yoke plate $2c_{12}$ made of a steel-based ferromagnetic plate material and formed with a central circle having a diameter smaller than the inner diameter of the annular magnet $2c_{11}$; and a second fixing yoke plate $2c_{13}$ made of a steel-based ferromagnetic plate material and formed with a central circle having a diameter smaller than the inner diameter of the annular magnet $2c_{11}$.

The first fixing yoke plate $2c_{12}$ and the second fixing yoke plate $2c_{13}$, which sandwich the annular magnet $2c_{11}$, in the direction of the fixed shaft $2a$, are disposed such that the central circles of the two yoke plates are coaxial with the fixed shaft $2a$. The assembled fixing portion $2c_1$ is embedded in a recess at a leading end of the fixed shaft $2b_1$, and fixed with an elastic member $2c_2$ or an adhesive.

The rotor 2 has a flange $2d$ fixed outside the hollow rotating shaft $2b_2$. The fixed shaft $2a$ of the axial bearing $2c$ is press fit and fixed in a central portion of the flange $2d$.

The fixed shaft $2a$ is formed with an outer cylindrical surface $2c_3$, which forms a magnetic gap between the central circle of the first fixing yoke plate $2c_{12}$ and the central circle of the second fixing yoke plate $2c_{13}$. The fixed shaft $2a$ is disposed such that the outer cylindrical surface $2c_3$ is coaxial with the rotating central axis of the fixed shaft $2a$ rotatably fixed on the rotor 2.

For the fixed shaft $2a$, a permanent magnet or a steel-based ferromagnetic material may be used. The polygon mirror 41 is carried on a top surface of the flange $2d$. Specifically, a screw $41b$ is inserted into a screw hole $41c$ formed in the fixed shaft $2a$ with a plate spring $41a$ interposed therebetween to fix the polygon mirror 41 in place. The flange $2d$ is also formed with miniature holes $2e$ for attenuating vertical vibrations, taking advantage of a viscous resistance of air when it passes therethrough.

The permanent magnet 1 has an even number of, for example, four poles in such a manner that an N-pole and an S-pole alternate in the circumferential direction. The permanent magnet 1 is adhesively fixed on a lower portion of the flange $2d$.

Above the polygon mirror 41, the cover 43 hollowed out to surround the rotor 2 is fixed to the housing 42 with a screw $42b$. The cover 43 has a glass window fixed on an opening through which laser light from a semiconductor laser, not shown, is incident. For fixing the glass window, a double-side adhesive tape or a bonding agent may be used. It should be noted that the cover 43 may be omitted if the rotating body is disposed within a closed space when it is mounted in the housing 42.

The printed circuit board 10 is integrally formed with the driver circuit 5, which sequentially switches conduction to the windings 4 in response to rotating position detecting signals from the rotating position detector elements $6a$, $6b$, $6c$ of the rotating position detecting mechanism 6 to control the rotor 2 such that it rotates at a constant rotational speed.

A driving element $5a$ of the driver circuit 5 is disposed between the beams $3e$ formed in the housing 42 outside the closed space in which the rotor 2 is positioned. The driving element $5a$ of the driver circuit 5, the position detector circuit and a part $6d_1$ in the other circuit $6d$ are cooled by an air fan, not shown, which may be disposed in a main body $40a$ of the polygon scanner 40.

The rotor 2 is corrected for balance on a pair of upper and lower correction planes $2f$, $2g$ so as to reduce unbalanced vibrations to a very small level.

Figure 7:
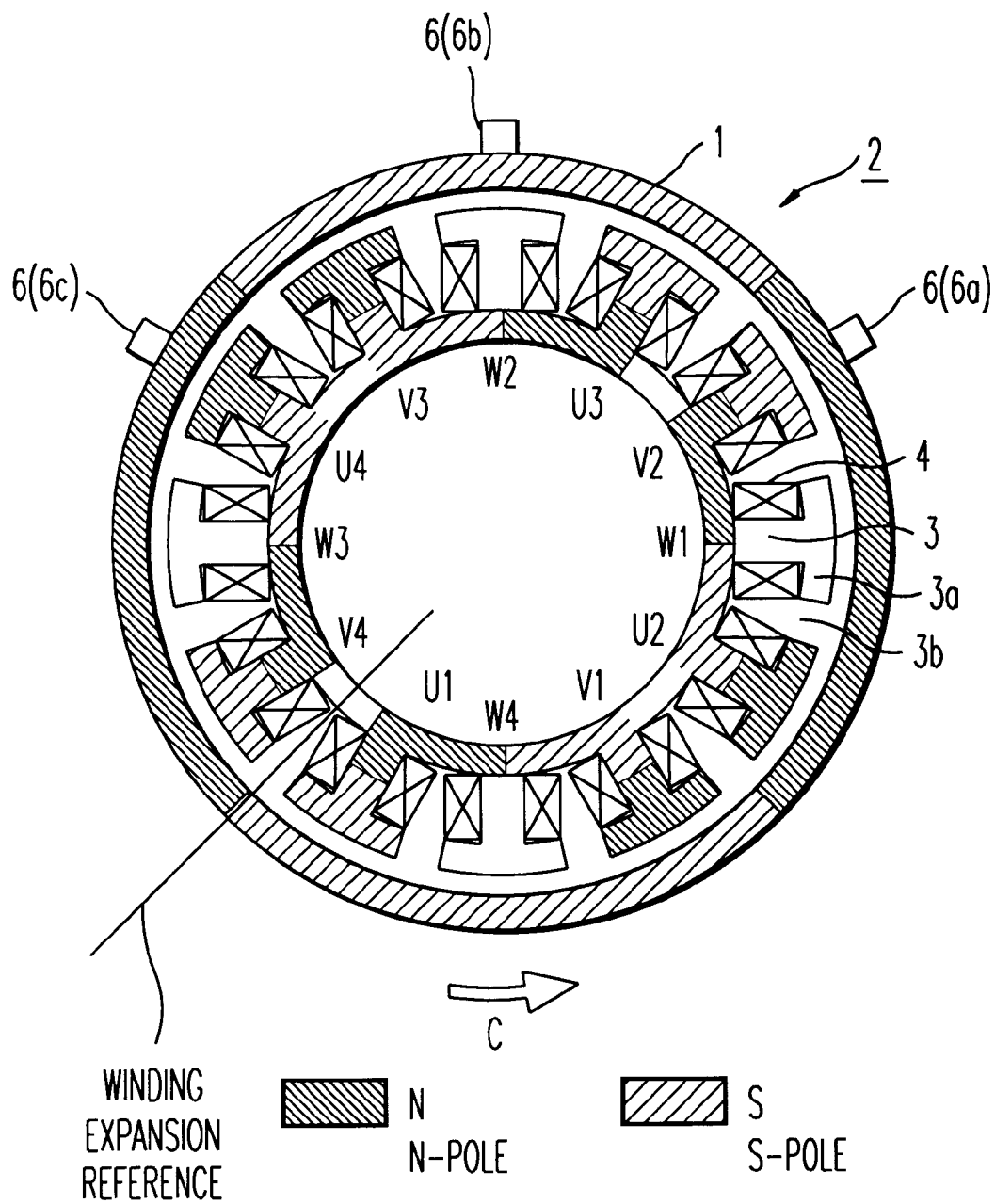
FIG. 7 is a cross-sectional view illustrating a main portion of the DC brushless motor of FIG. 5.

Referring now to FIG. 7, the stator core 3 is disposed inside of and concentrically with the annular permanent magnet 1 having four magnetized poles in two pairs, fixed on the rotor 2. Specifically, the stator core 3 is formed with 12 T-shaped pole shoes $3a$ made of a ferromagnetic material and radially extending outward, and 12 windings 4 are positioned in open slots $3b$ between the respective adjacent T-shaped pole shoes $3a$.

The windings 4 include three phases designated as a U-phase, a V-phase and a W-phase, where a set of four windings U1, U2, U3, U4 form the U-phase; a set of four windings V1, V2, V3, V4 form the V-phase; and a set of four windings W1, W2, W3, W4 form the W-phase.

For detecting a rotating position of the permanent magnet 1, the rotating position detector elements $6a$, $6b$, $6c$ of the rotating position detecting mechanism 6 are disposed at intervals of 60°. The rotating position detector elements may be electromagnetic transducing elements such as hole elements.

Figure 8:
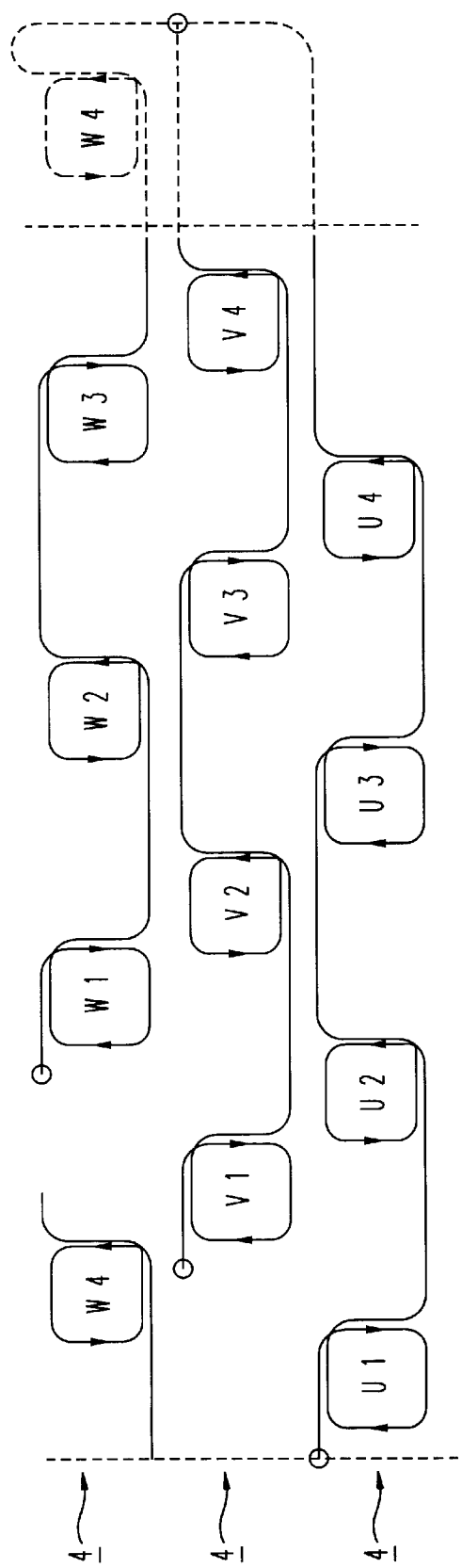
FIG. 8 is a schematic diagram for explaining how windings are wound around respective pole shoes in the DC brushless motor of FIG. 5.

Referring now to FIGS. 8 and 9A–9B to explain how the windings 4 are wound around the respective pole shoes $3a$. Viewed from the permanent magnet 1, U1, U2, U3, U4 in the U-phase of the windings 4 are wound alternately in the opposite directions and connected to each other such that a current conducted therethrough causes the T-shaped shoe poles, wound with windings U1, U2, U3, U4, to have opposite magnetic polarities in alternation.

The windings 4 in the three winding groups of the U-phase, V-phase and W-phase are connected in a Y-shaped connection configuration generally designated by 8 in FIG. 9A. The windings 4 of the U-phase, V-phase and W-phase are disposed such that the magnetic polarities generated when a current flows into these windings 4 from a common connection point $8a$ of the Y-shaped connection configuration are opposite to each other between adjacent ones of the windings such as between U1 and W4, between W4 and V1, and so on.

The windings 4 of the U-phase, V-phase and W-phase may be connected with each set of U1–U4, V1–V4 and W1–W4 being connected in series as illustrated in FIG. 9A, or with two sets of two windings in each set being connected in parallel as illustrated in FIG. 9B. Further, the four windings of each set may be connected in parallel, though not shown.

One end of each of three sets of windings 4, i.e., U-phase, V-phase, W-phase is connected to the driver circuit 5, which sequentially switches the phases through which a current is conducted, to generate a rotating magnetic field that causes the rotor 2 to rotate.

Two phases are selected for conduction by rotating position detecting signals of the rotating position detector elements $6a$, $6b$, $6c$. FIG. 7 illustrates a state in which the U-phase and V-phase are selected and energized when the rotating position detector elements $6a$, $6b$, $6c$ have detected N-pole, S-pole, N-pole, respectively.

Then, a current flows into U1 in a direction indicated by an arrow B in FIG. 9A and flows out of V1, causing the S-polarity to occur at the T-shaped pole shoes $3a$ associated with U1, U3; the N-polarity to occur at the T-shaped pole shoes $3a$ associated with U2, U4; the N-polarity to occur at the T-shaped protrusions $3a$ associated with V1, V3; and the S-polarity to occur at the T-shaped pole shoes $3a$ associated with V2, V4. Thus, a magnetic repellent force or a magnetic attractive force acts between the entire periphery of the permanent magnet 1 and the stator core 3, forcing the permanent magnet 1 to rotate in the direction indicated by the arrow C in FIG. 7.

Figure 10:
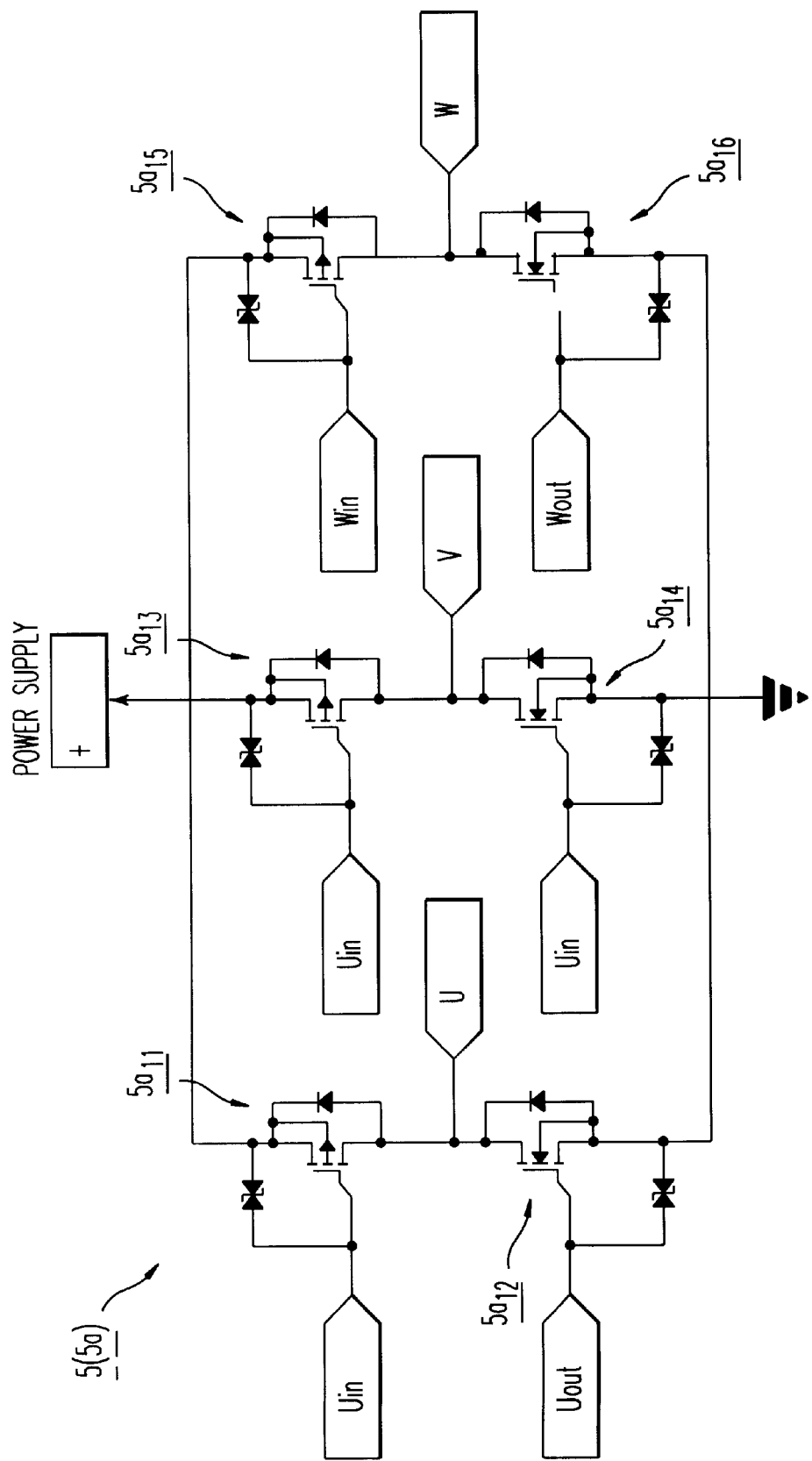
FIG. 10 is a circuit diagram illustrating a two-phase energization driving scheme for the DC brushless motor of FIG. 5.

Referring now to FIG. 10, the above-mentioned two-phase energization driving scheme is implemented by the driving element 5a of the driver circuit 5. The driving element 5a includes six conduction change-over switches $5a_{11}$, $5a_{12}$, $5a_{13}$, $5a_{14}$, $5a_{15}$, $5a_{16}$. Six transistors or field effect transistors may be used for the switches.

Figure 11A:
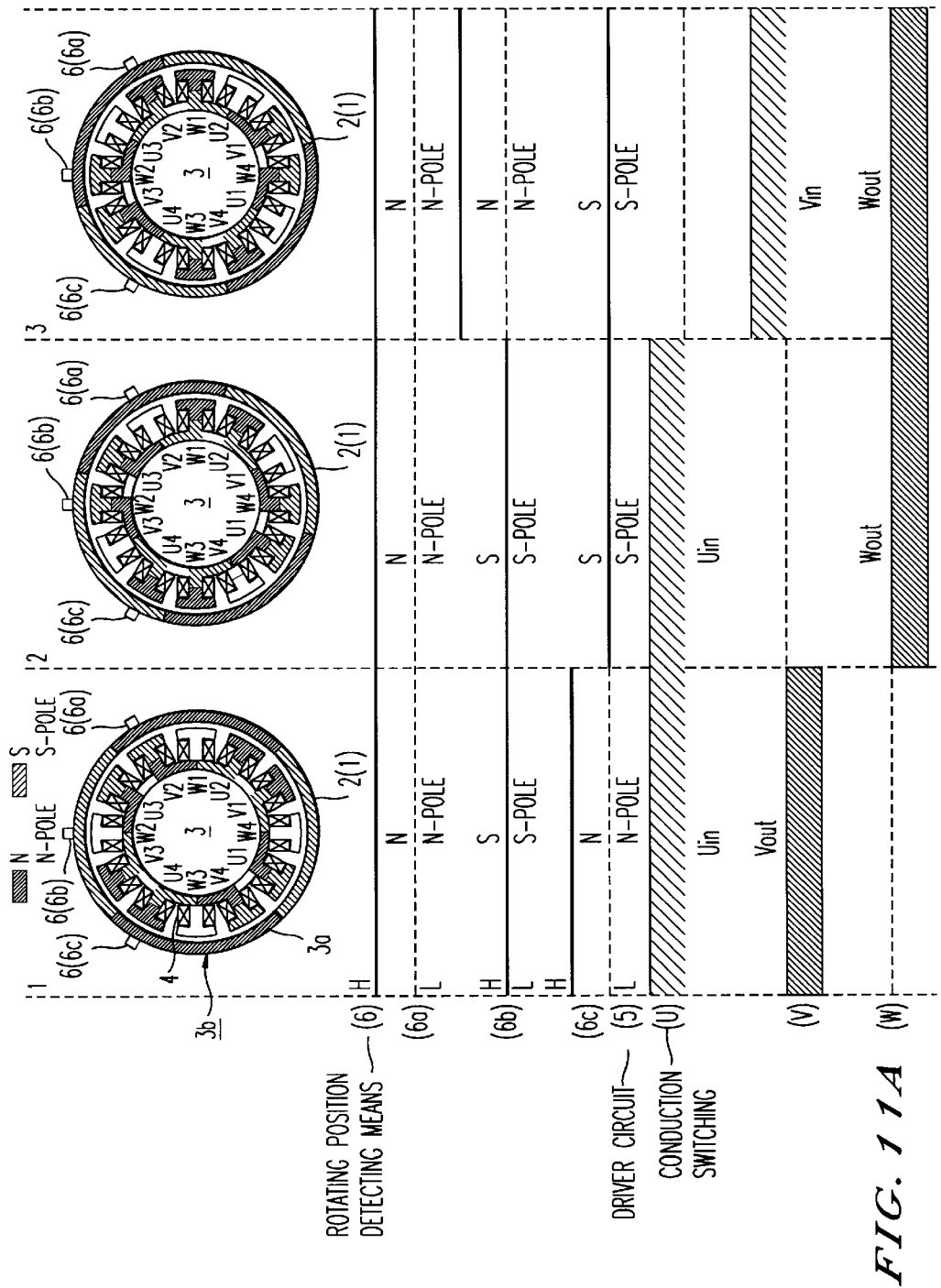
FIG. 11 shows how the conduction is switched to generate a rotating magnetic field in the DC brushless motor of FIG. 5.
Figure 11B:
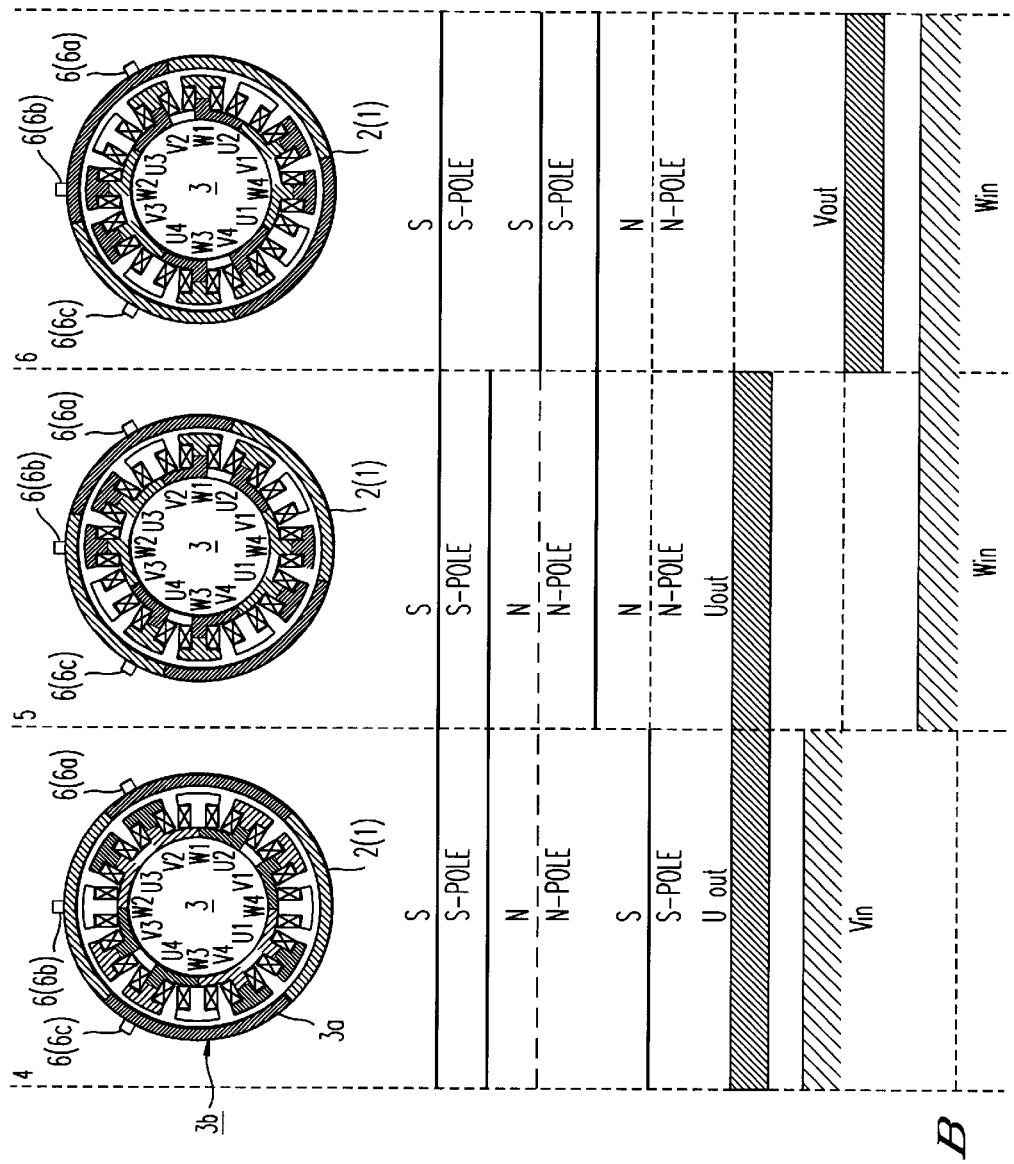

Referring next to FIG. 11, a detailed description will be made on the detection of the rotating position of the permanent magnet 1 made by the three rotating position detector elements 6a, 6b, 6c, the generation of a rotating magnetic field by switching of conduction through the driver circuit 5, and the rotation of the permanent magnet 1 induced by the rotating magnetic field.

Specifically, FIG. 11 illustrates that the phases subjected to the conduction are switched every 30° to form the energized polarities to generate a rotating magnetic field, which causes the permanent magnet 1 to rotate together with the rotor 2 in the counter-clockwise direction.

As the permanent magnet 1 is rotated over an angular distance of 180°, the conduction is switched six times by the driver circuits 5 so that the conduction is switched twelve times during a full rotation of the permanent magnet 1. Thus, magnetic circuits are formed between U1 and V1, between U2 and V2, between U3 and V3, and between U4 and V4 of the windings 4, respectively, with W4, W1, W3 interposed therebetween, so that a magnetic repellent force and a magnetic attractive force act on all of the four poles of the permanent magnet 1 to cause the rotor 2 to rotate in a predetermined direction, thereby making it possible to effectively utilize the entire periphery of the permanent magnet 1.

As described above, the DC brushless motor 0 of this embodiment can increase the driving efficiency, and reduce the thickness of the stator core 3 by distributing the windings 4 and reducing the number of turns of each winding 4, thus contributing to a reduction in size of the DC brushless motor 0.

Since the driver circuit 5 switches the conduction to selectively pass a current to two phases of the windings 4 within three phases of the winding groups 7 to generate a rotating magnetic field which drives the rotor 2 to rotate, it is possible to provide the DC brushless motor 0 that improves a magnetic force utilization factor of the permanent magnet 1.

In the foregoing embodiment, the DC brushless motor 0 includes the permanent magnet 1 having four poles, the stator core 3 having 12 T-shaped pole shoes 3a opposite to the four poles, 12 open slots 3b, and 12 windings 4. The DC brushless motor 0 in the following alternative configuration can also produce similar effects.

Assume that an alternate DC brushless motor has an even number n of magnetic poles and n windings 4 per phase. The n windings 4 are disposed on the circumference of the stator core 3 at equal intervals. The windings 4 are divided into three sets of winding groups 7 corresponding to three phases, wherein adjacent windings, such as U1 and U2, are wound in the opposite directions so as to generate opposite magnetic polarities when a current is passed therethrough. The three sets of winding groups 7 are connected in the Y-shaped connection configuration 8 as illustrated in FIG. 9A, and arranged such that when a current flows from the common connection point 8a of the Y-shaped connection configuration 8 into the windings 4, opposite magnetic polarities occur in alternation.

More specifically, the alternate DC brushless motor 0 may include a permanent magnet 1 fixed on a rotor 2 and having six poles and a stator core 3 having 18 T-shaped pole shoes 3a wound with windings 4; a permanent magnet 1 fixed on a rotor 2 and having eight poles and a stator core 3 having 24 T-shaped pole shoes 3a wound with windings 4; or the like.

Next, another embodiment will be described with reference to FIG. 12.

Referring specifically to FIG. 12, a stator core 3 is disposed inside of and concentrically with an annular permanent magnet 1 fixed on a rotor 2. Specifically, the stator core 3 is formed with 12 T-shaped pole shoes 3a made of a ferromagnetic material and radially extending outward, and 12 windings 4 are positioned in open slots 3b between the respective adjacent T-shaped pole shoes 3a.

The windings 4 includes three phases designated as a U-phase, a V-phase and a W-phase, where a set of four windings U1, U2, U3, U4 form the U-phase; a set of four windings V1, V2, V3, V4 form the V-phase; and a set of four windings W1, W2, W3, W4 form the W-phase.

The windings 4 in a plurality of winding groups 7 are identical to those in the foregoing embodiment previously described with reference to FIG. 8.

Specifically, U1, U2, U3, U4 in the U-phase of the windings 4 are wound alternately in the opposite directions and connected to each other such that a current conducted therethrough causes the T-shaped shoe poles 3a, wound with windings U1, U2, U3, U4, to have the opposite magnetic polarities.

Both ends of each of three sets of windings groups 7 of the U-phase, V-phase, W-phase are connected to the driver circuit 5. For detecting a rotating position of the permanent magnet 1 fixed on the rotor 2, the rotating position detector elements 6a, 6b, 6c of the rotating position detecting mechanism 6 are disposed at intervals of 60°. The rotating position detector elements may be electromagnetic transducing elements such as hole elements. The driver circuit 5, responsive to rotating position detecting signals of the rotating position detector elements 6a, 6b, 6c, sequentially switches the phases through which a current is conducted, to generate a rotating magnetic field which causes the rotor 2 to rotate.

FIG. 12 illustrates a state in which the V-phase is selected and energized when the rotating position detector elements 6a, 6b, 6c have detected N-pole, S-pole, N-pole, respectively.

Then, a current flows into the V-phase, causing the N-polarity to occur at the T-shaped pole shoes 3a associated with V1, V3; and the S-polarity to occur at the T-shaped pole shoes 3a associated with V2, V4. Thus, a magnetic repellent force or a magnetic attractive force acts between the permanent magnet 1 and the stator core 3, forcing the permanent magnet 1 to rotate in the direction indicated by the arrow C in FIG. 12.

Figure 13:
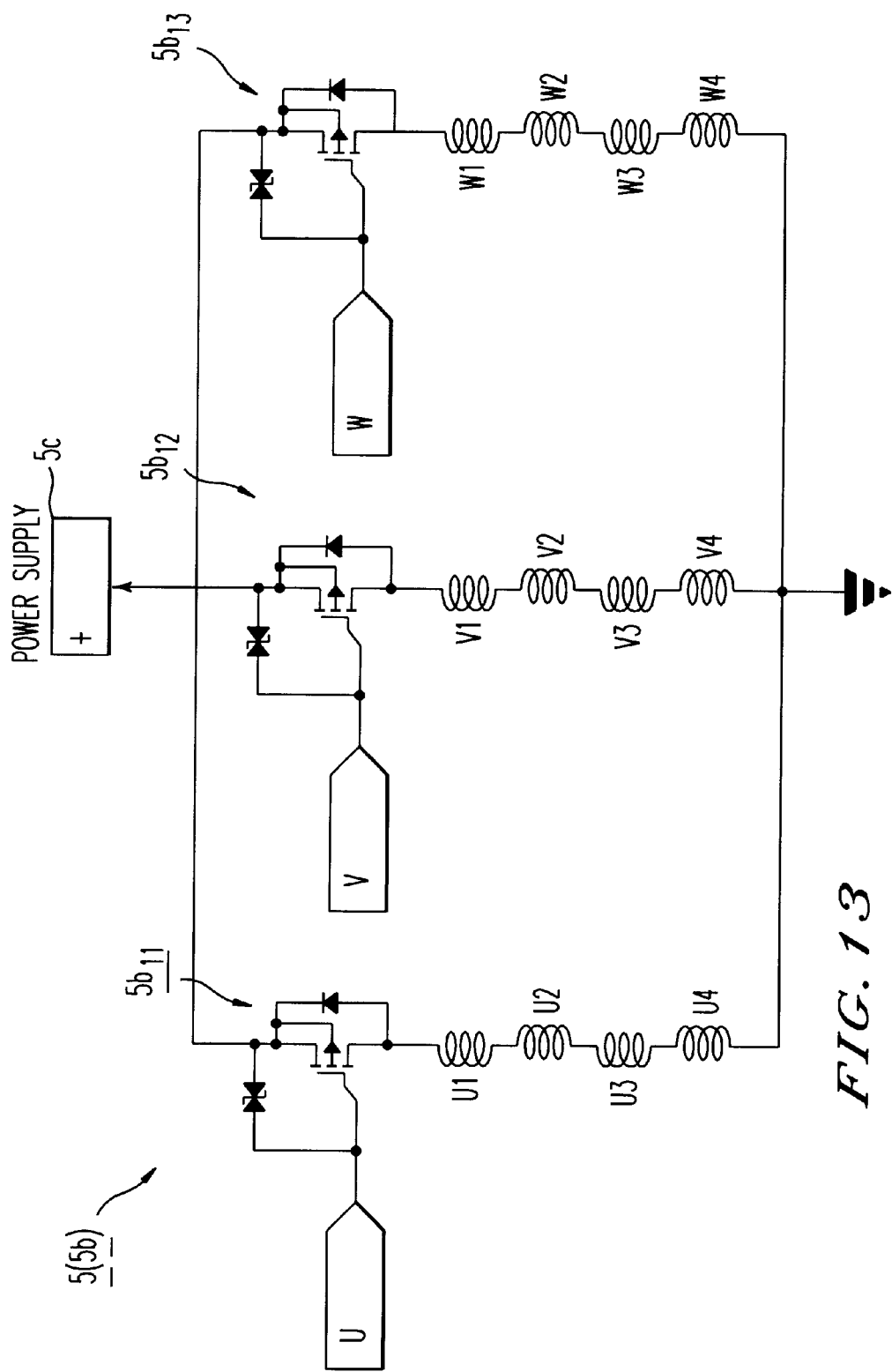
FIG. 13 is a circuit diagram illustrating a one-phase energization driving scheme for the DC brushless motor of FIG. 12.

Referring now to FIG. 13, the above-mentioned one-phase energization driving scheme is implemented by the driving element 5b of the driver circuit 5.

The driving element 5b includes three conduction change-over switches $5b_{11}$, $5b_{12}$, $5b_{13}$. Three transistors or field effect transistors may be used for the switches.

When the two-phase energization driving scheme is changed to the one-phase energization driving scheme, the driver circuit 5 only requires three conduction change-over switches, which is one half the number of switches required by the two-phase energization driving scheme. Consequently, the DC brushless motor 0 realizes a reduced frequency of conduction switching, a reduced switching loss, a smaller size, a lower cost, and a high loss reduction effect particularly in higher rotational speeds. This DC brushless motor 0 may also be employed in a polygon scanner.

The plurality of winding groups 7 in three sets of U-phase, V-phase, W-phase are connected in a Y-shaped connection configuration similar to that illustrated in FIG. 9A, and arranged such that when a current flows from the common connection point 8a of the Y-shaped connection configuration 8 into the windings 4, opposite magnetic polarities occur in adjacent windings 4 such as U1 and W4, W4 and V1, or the like.

The four windings 4 in each phase may be connected in series, or two sets of two windings 4 may be connected in parallel. Alternatively, the four windings 4 may be connected in parallel, though not shown.

Figure 14:
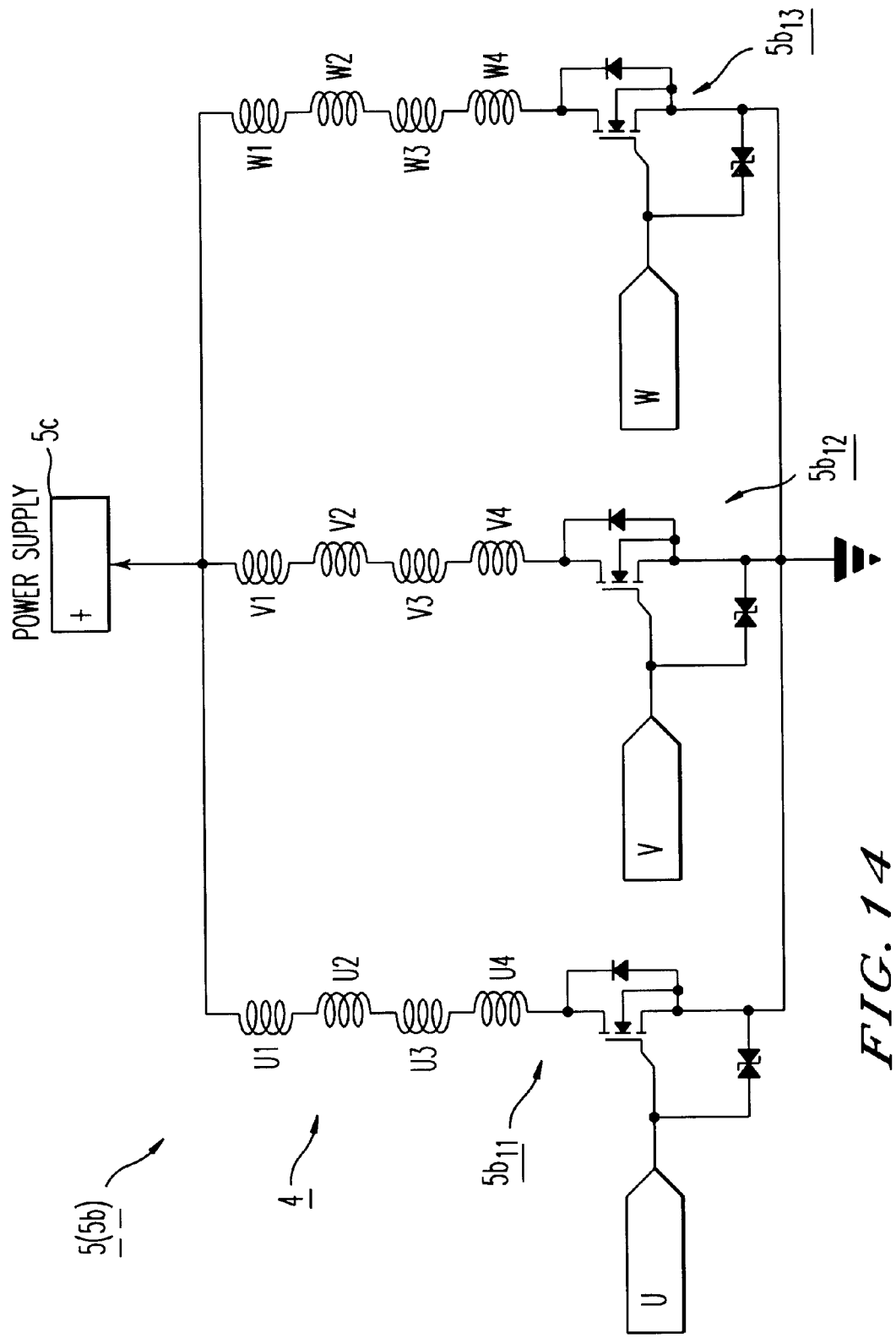
FIG. 14 is a circuit diagram illustrating another one-phase energization driving scheme for the DC brushless motor of FIG. 12.

Referring now to FIG. 14, a description will be made on another form of connection between the conduction change-over switches $5b_{11}$, $5b_{12}$, $5b_{13}$ and the windings 4 when the one-phase energization driving scheme is implemented. In the example of FIG. 14, the four windings 4 may be disposed on the ground side of the three conduction change-over switches $5b_{11}$, $5b_{12}$, $5b_{13}$, contrary to the configuration illustrated in FIG. 13, where the conduction change-over switches are disposed on the power supply side. Similar effects to the foregoing can be produced also in the configuration of FIG. 14.

Figure 15A:
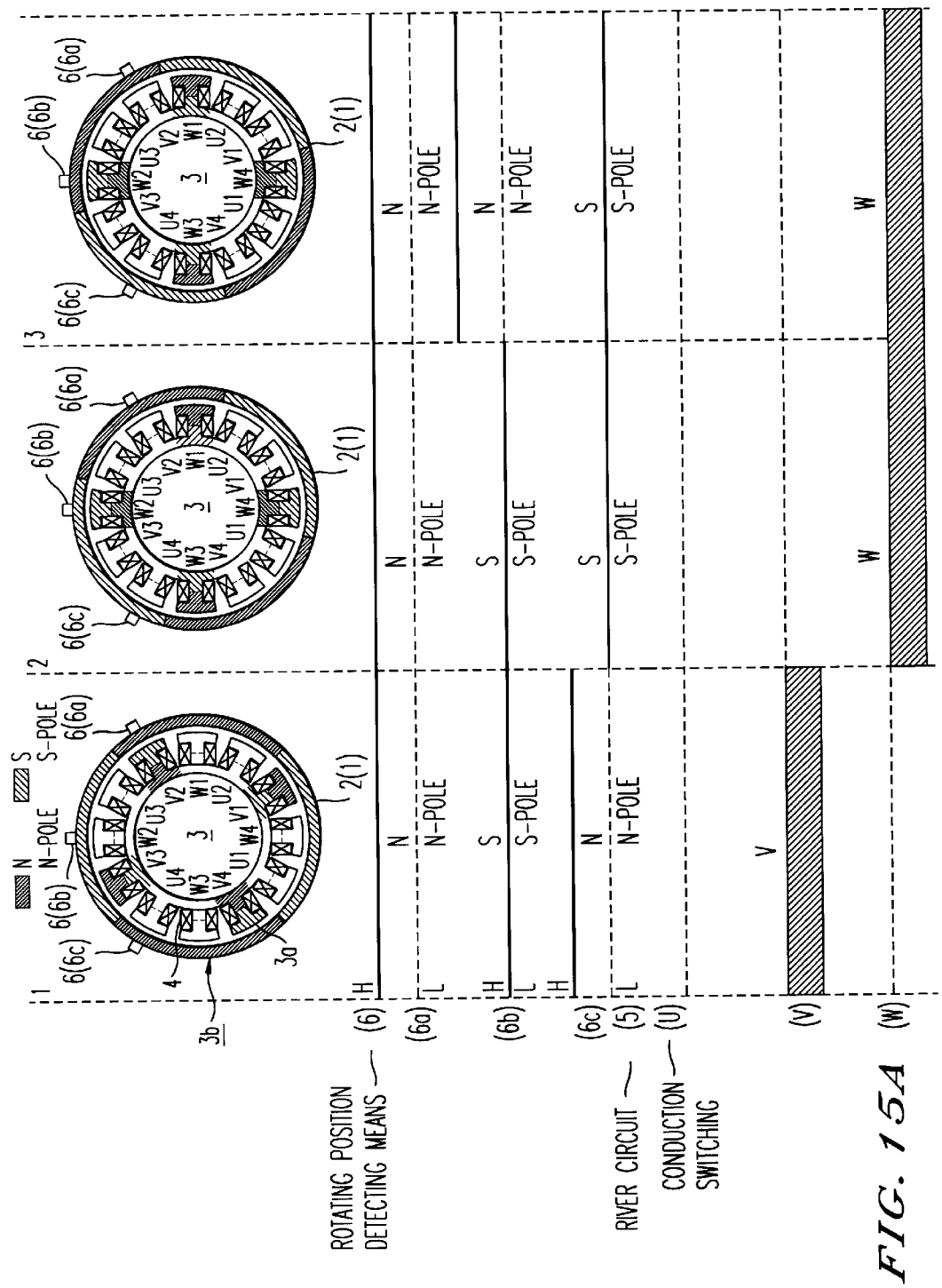
FIG. 15 shows how the conduction is switched to generate a rotating magnetic field in the DC brushless motor of FIG. 5.
Figure 15B:
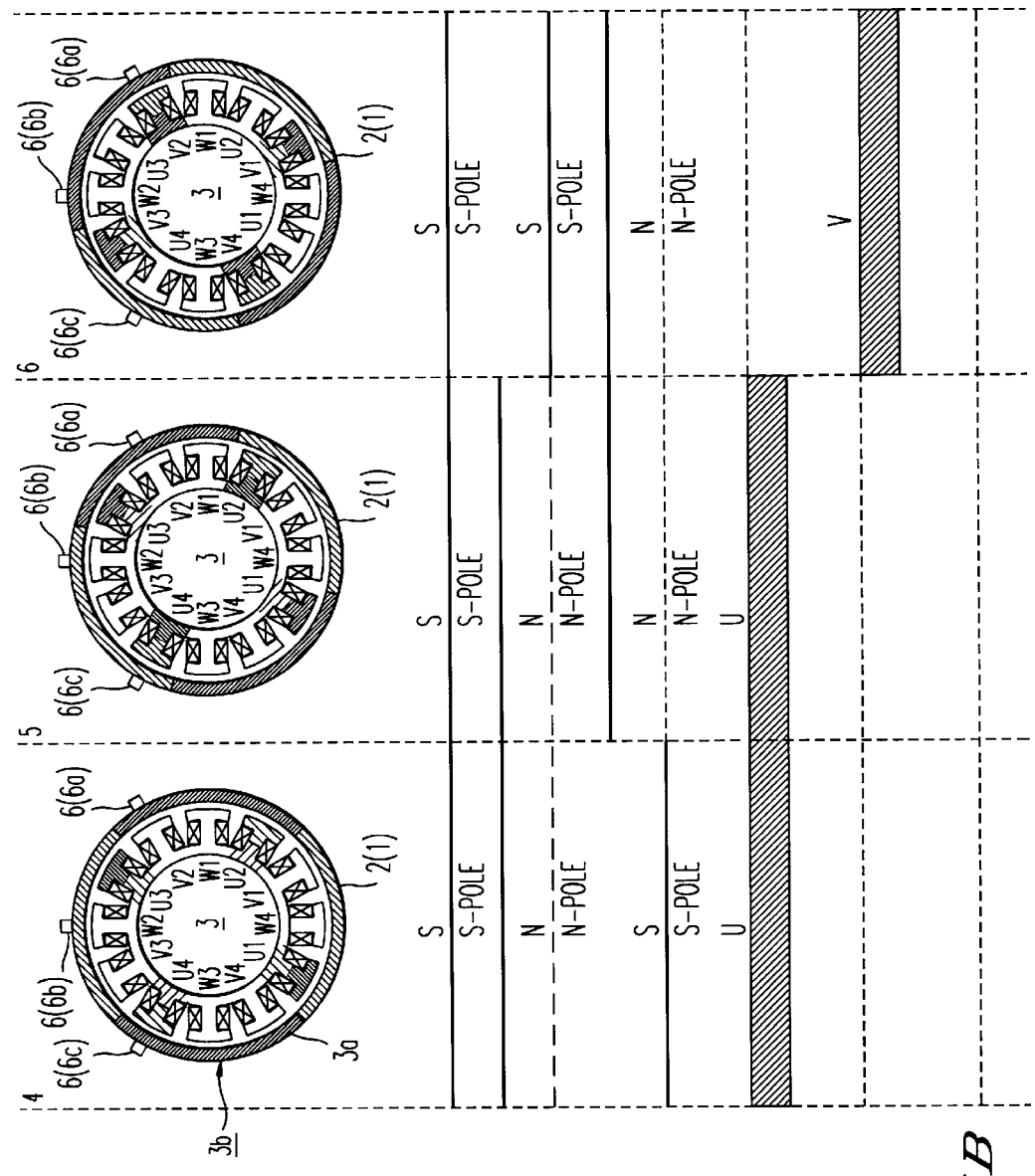

Referring now to FIG. 15, a detailed description will be made on the detection of the rotating position of the permanent magnet 1 made by the three rotating position detector elements 6a, 6b, 6c, the generation of a rotating magnetic field by switching of conduction through the driver circuit 5, and the rotation of the permanent magnet 1 induced by the rotating magnetic field.

Specifically, FIG. 15 shows that the phases subjected to conduction are switched every 60° by the driver circuit 5 to form the energized polarities to generate a rotating magnetic field, which causes the permanent magnet 1 to rotate in the counter-clockwise direction.

As the permanent magnet 1 is rotated over an angular distance of 180°, the conduction is switched three times by the driver circuits 5 so that the conduction is switched six times during a full rotation of the permanent magnet 1. In comparison with the foregoing embodiment, the number of times of conduction switching performed during a full rotation of the permanent magnet 1 can be reduced to one half, thereby making it possible to reduce a loss due to the switching. Since the loss caused by the switching is proportional to the number of times of switching, and therefore the conduction switching is performed more frequently in a unit time at a higher rotational speed, the reduction in the number of times of conduction switching results in a reduction in the switching loss. It should be noted that FIG. 15 illustrates that the phases subjected to conduction are switched every 30° similar to the foregoing embodiment for purposes of comparison.

Figure 17A:
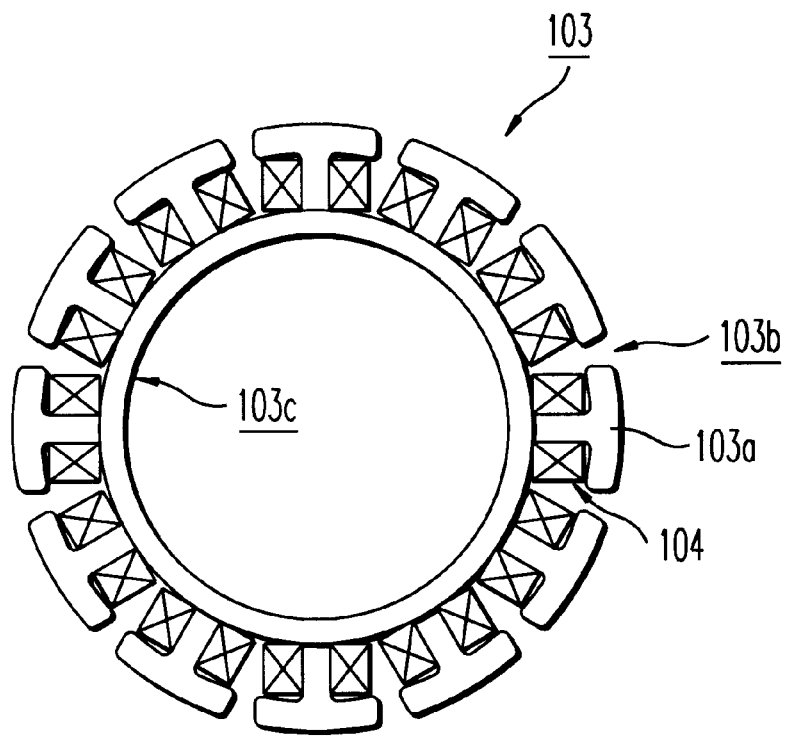
FIGS. 17A and 17B are a top view and a perspective view of a stator core used in the DC brushless motor of FIG. 16.
Figure 17B:
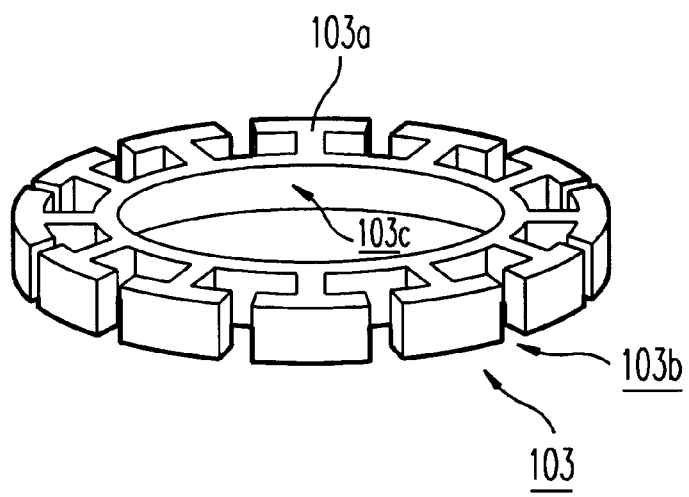
Figure 18:
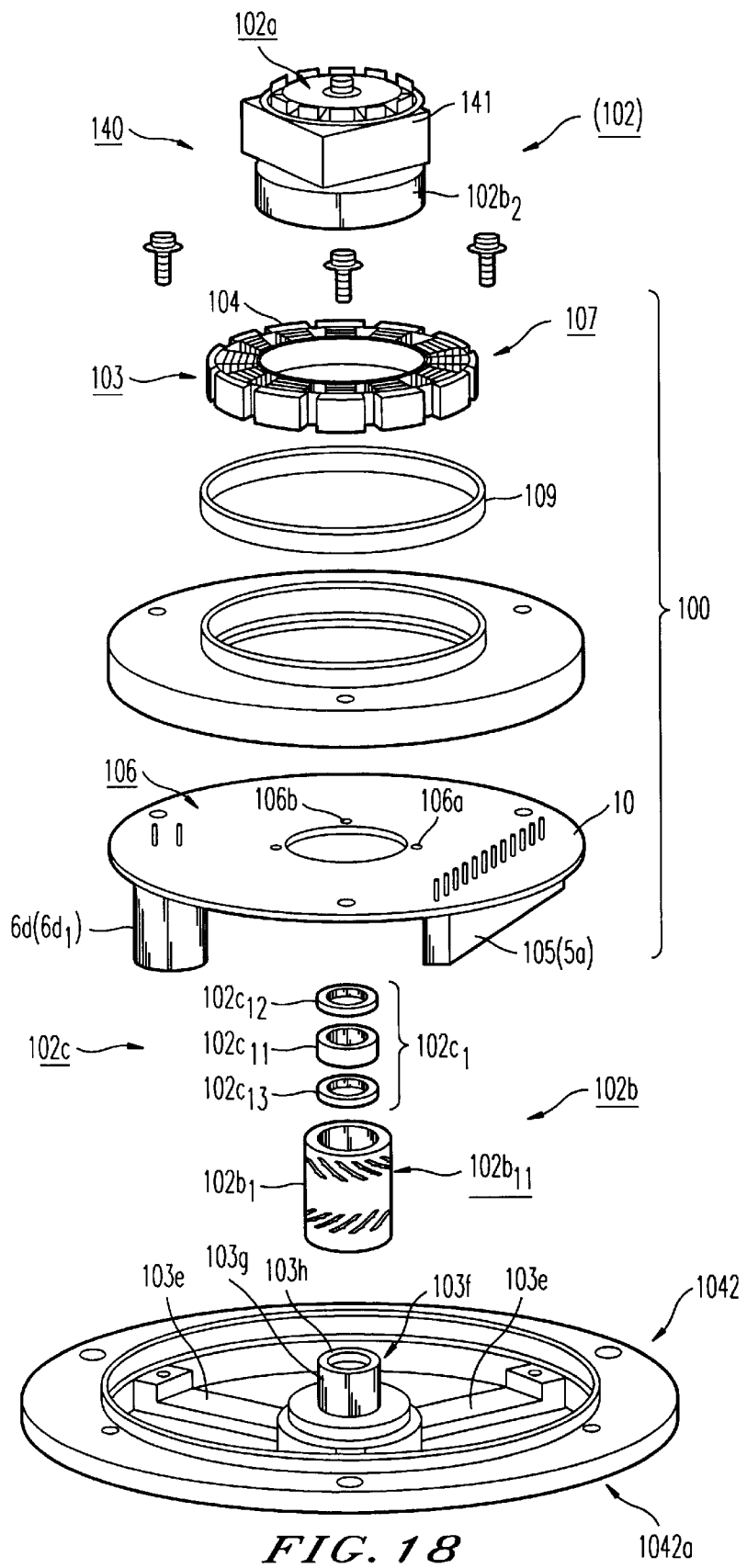
FIG. 18 is an exploded perspective view illustrating a main portion of the DC brushless motor of FIG. 16.

Referring next to FIGS. 16–18, a description will be made on a direct-current brushless motor 100 according to another embodiment of the present invention. Generally, the DC brushless motor 100 is of a radial gap inner rotor type, which has a permanent magnet 101 fixed on a rotor 102 disposed outside of and concentrically with a stator core 103. Specifically, the rotor 102 has the permanent magnet 101 having an even-number n of poles fixed thereon and held rotatable therewith. The stator core 103 corresponds to the magnetic poles of the permanent magnet 101. The windings 104, fixedly wound around the stator core 103, include a plurality of phases for selectively generating magnetic polarities in sequence. A driver circuit 105 switches conduction to the windings 104. A rotating position detecting mechanism 106 detects the rotating position of the permanent magnet 101. A plurality of winding groups 107 generate magnetic polarities in the plurality of windings 104 so as to generate a magnetic repellent force or a magnetic attractive force by the driver circuit 105 between all of the magnetic poles of the permanent magnet 101 and magnetic poles of selected phases on the stator core 103 based on a rotating position detected by the rotating position detecting mechanism 106.

A polygon scanner 140 includes the DC brushless motor 100; a polygon mirror 141 fixed on the rotor 102 of the DC brushless motor 100; a housing 142; and so on.

The housing 142 is protrusively formed with a reference surface 142a for mounting to an optical housing, not shown. The housing 42 contains a printed circuit board 110, forming part of the DC brushless motor 100, which is fixed with a screw 110a or an adhesive, not shown.

A ring-shaped member 109 made of a ferromagnetic material is fitted on the stator core 103 to improve the magnetic characteristic of the DC brushless motor 100.

Mounted on the printed circuit board 110 are the stator core 103, made of a ferromagnetic material, wound with the windings 104; and three rotating position detector elements 106a, 106b, 106c forming part of the rotating position detecting mechanism 106, each including a hole element. Although not shown, the printed circuit board 110 is also formed with a wiring pattern for connecting these components to the driver circuit 105, a position detector circuit of the rotating position detecting mechanism 106, and other circuits 106d.

As can be best seen in FIG. 17A, the stator core 103 is formed with an internal continuous surface 103c, cylindrical in shape, which is formed with a plurality of T-shaped pole shoes 103a radially extending therefrom.

The stator core 103 is typically fabricated by stacking a plurality of thin silicon steel plates stamped by a press machine in order to reduce a core loss. However, the stator core 103 is not limited to this structure, and may be made of any ferromagnetic material in any appropriate manner.

The T-shaped pole shoes 103a of the stator core 103 are wound with the windings 104, and formed with open slots 103b along the outer periphery. As can be seen in FIGS. 17A and 17B, the stator core 103 has a shape similar to that of the aforementioned outer rotor type stator core 3, so that the stator core 103 facilitates a winding operation and therefore reduces a cost for the windings.

The printed circuit board 110 closely contacts the housing 142 along the circumference and closely contacts a base 103d of the stator core 103 in an inner peripheral portion. The base 103d also closely contacts the housing 142 which cooperates with a cover 143 to isolate from the outside a closed space in which the rotor 102 and the polygon mirror 141 fixed on the rotor 102 are accommodated.

At the center of the housing 142 is formed a cylindrical bearing mount reference 103f, which is joined to and integrally machined with a plurality of beams 103e extending radially from the outer periphery thereof A fixed shaft $102b_1$ made of a non-magnetic material and forming part of a radial dynamic pressure air bearing 102b is adhesively fixed on a central portion of the housing 142 with reference to a reference surface 103g.

The cylindrical surface of the fixed shaft $102b_1$ is formed with herringbone groves $102b_{11}$ for constituting the radial dynamic pressure air bearing 102b. As the rotor 102 starts rotating, air pressure becomes high in a gap between a hollow rotating shaft $102b_2$ and the fixed shaft $102b_1$ to form a dynamic pressure air bearing which supports the rotor 102 in a non-contacting manner in a radial direction.

An axial bearing 102c, which may be an attractive magnetic bearing, has a fixing portion $102c_1$ embedded inside the fixed shaft $102_{b1}$ with reference to an end surface 103h of the cylindrical bearing mount reference 103f formed at the center of the housing 142.

The fixing portion $102c_1$ includes an annular magnet $102_{c11}$, which is made mainly of a rear earth based material and has two poles magnetized in the direction of the fixed shaft 102a fixed on the rotor 102; a first fixing yoke plate $102c_{12}$ made of a steel-based ferromagnetic plate material and formed with a central circle having a diameter smaller than the inner diameter of the annular magnet $102c_{11}$; and a second fixing yoke plate $102c_{13}$ made of a steel-based ferromagnetic plate material and formed with a central circle having a diameter smaller than the inner diameter of the annular magnet $102c_{11}$.

The first fixing yoke plate $102c_{12}$ and the second fixing yoke plate $102c_{13}$, which sandwich the annular magnet $102c_{11}$ in the direction of the fixed shaft 102a, are disposed such that the central circles of the two yoke plates are coaxial with the fixed shaft 102a. The assembled fixing portion $102c_1$ is embedded in a recess at a leading end of the fixed shaft $102b_1$, and fixed with an elastic member $102c_2$ or an adhesive.

The rotor 102 has a flange 102d fixed outside the hollow rotating shaft $102b_2$. The fixed shaft 102a of the attractive magnetic bearing of the axial bearing 102c is press fit and fixed in a central portion of the flange 102d.

The fixed shaft 102a is formed with an outer cylindrical surface $102c_3$, which forms a magnetic gap between the central circle of the first fixing yoke plate $102c_{12}$ and the central circle of the second fixing yoke plate $102c_{13}$. The fixed shaft 102a is disposed such that the outer cylindrical surface $102c_3$ is coaxial with the rotating central axis of the fixed shaft 102a rotatably fixed on the rotor 102.

For the fixed shaft 102a, a permanent magnet or a steel-based ferromagnetic material may be used. The polygon mirror 141 is carried on a top surface of the flange 102d. Specifically, a screw 141b is inserted into a screw hole 141c formed in the fixed shaft 102a with a plate spring 141a interposed therebetween to fix the polygon mirror 141 in place. The flange 102d is also formed with miniature holes 102e for attenuating vertical vibrations, taking advantage of a viscous resistance of air when it passes therethrough.

The permanent magnet 101 has an even number of, for example, four poles in such a manner that an N-pole and an S-pole alternate in the circumferential direction. The permanent magnet 101 is adhesively fixed on a lower portion of the flange 102d.

Above the polygon mirror 141, the cover 143 hollowed out to surround the rotor 102 is fixed to the housing 142 with a screw 142b. The cover 143 has a glass window fixed on an opening through which laser light from a semiconductor laser, not shown, is incident. For fixing the glass window, a double-side adhesive tape or a bonding agent may be used. It should be noted that the cover 143 may be omitted if the rotating body is disposed within a closed space when it is mounted in the housing 142.

The printed circuit board 110 is integrally formed with the driver circuit 105, which sequentially switches conduction to the windings 104 in response to rotating position detecting signals from the rotating position detector elements 106a, 106b, 106c of the rotating position detecting mechanism 106 to control the rotor 102 such that it rotates at a constant rotational speed. The rotating position detector elements 106a, 106b, 106c may be hole elements.

A driving element 105a of the driver circuit 105 is disposed between the beams 103e formed in the housing 142 outside the closed space in which the rotor 102 is positioned. The driving element 1O5a of the driver circuit 105, the position detector circuit and a part $106d_1$ in the other circuit 106d are cooled by an air fan, not shown.

The rotor 102 is corrected for balance on two upper and lower correction planes 102f, 102g so as to reduce unbalanced vibrations to a very small level.

Figure 19:
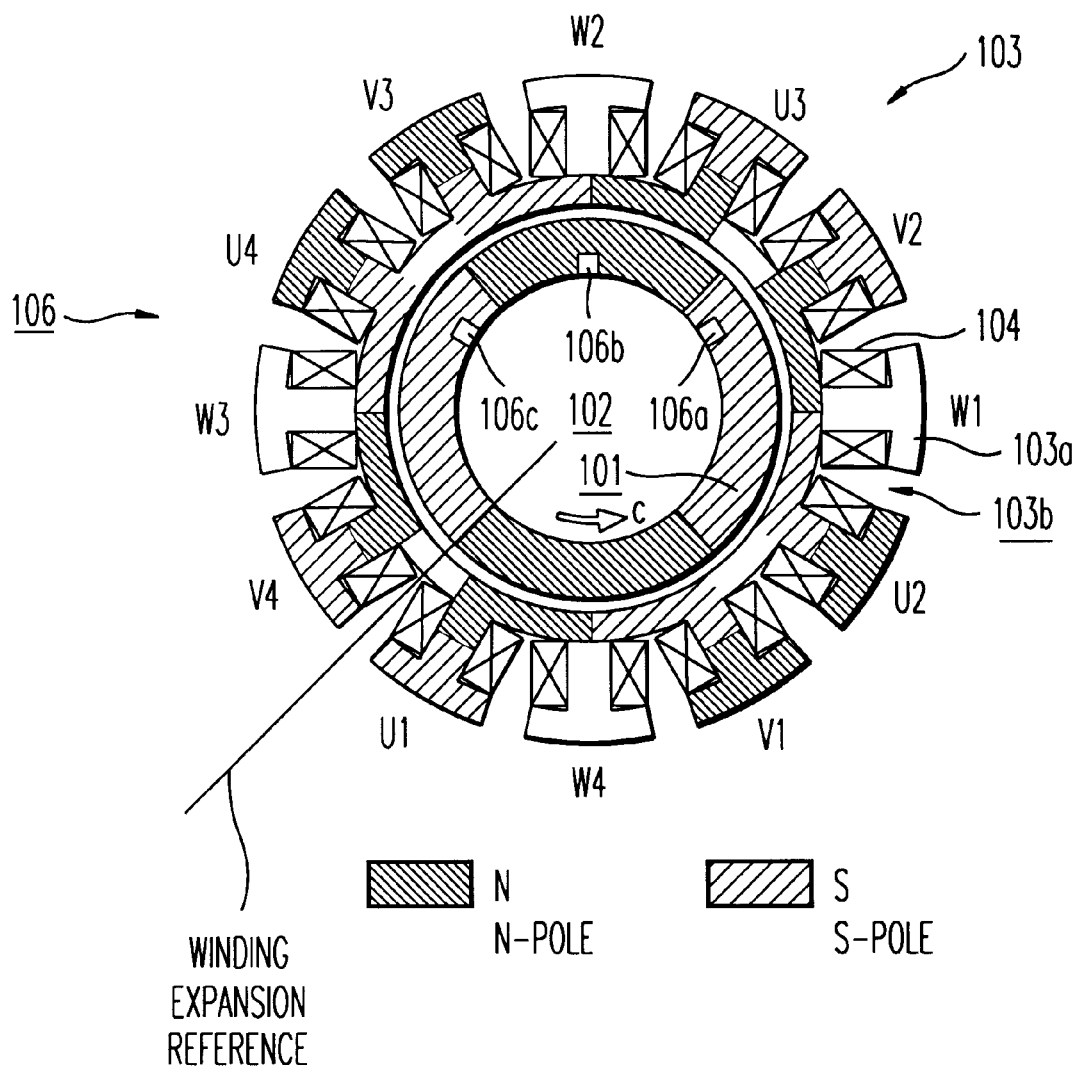
FIG. 19 is a cross-sectional view illustrating a main portion of the DC brushless motor of FIG. 16.

Referring now to FIG. 19, the stator core 103 is disposed outside of and concentrically with the annular permanent magnet 101 having four magnetized poles in two pairs and fixed on the rotor 102. Specifically, the stator core 103 is formed with 12 T-shaped pole shoes 103a made of a ferromagnetic material and radially extending outward, and 12 windings 104 are positioned in open slots 103b between the respective adjacent T-shaped pole shoes 103a.

The windings 104 include three phases designated as a U-phase, a V-phase and a W-phase, where a set of four windings U1, U2, U3, U4 form the U-phase; a set of four windings V1, V2, V3, V4 form the V-phase; and a set of four windings W1, W2, W3, W4 form the W-phase.

For detecting a rotating position of the permanent magnet 101 fixed on the rotor 102, the rotating position detector elements 106a, 106b, 106c of the rotating position detecting mechanism 106 are disposed at intervals of 60°. The rotating position detector elements may be electromagnetic transducing elements such as hole elements.

Figure 20:
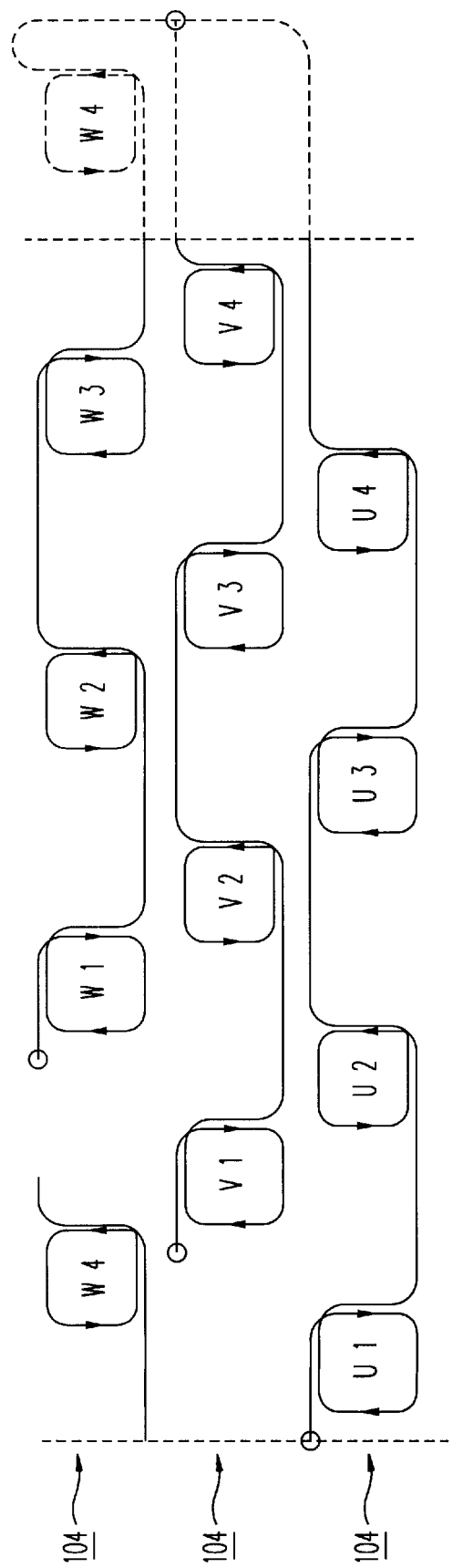
FIG. 20 is a schematic diagram for explaining how windings are wound around respective pole shoes in the DC brushless motor of FIG. 16.
Figure 21A:
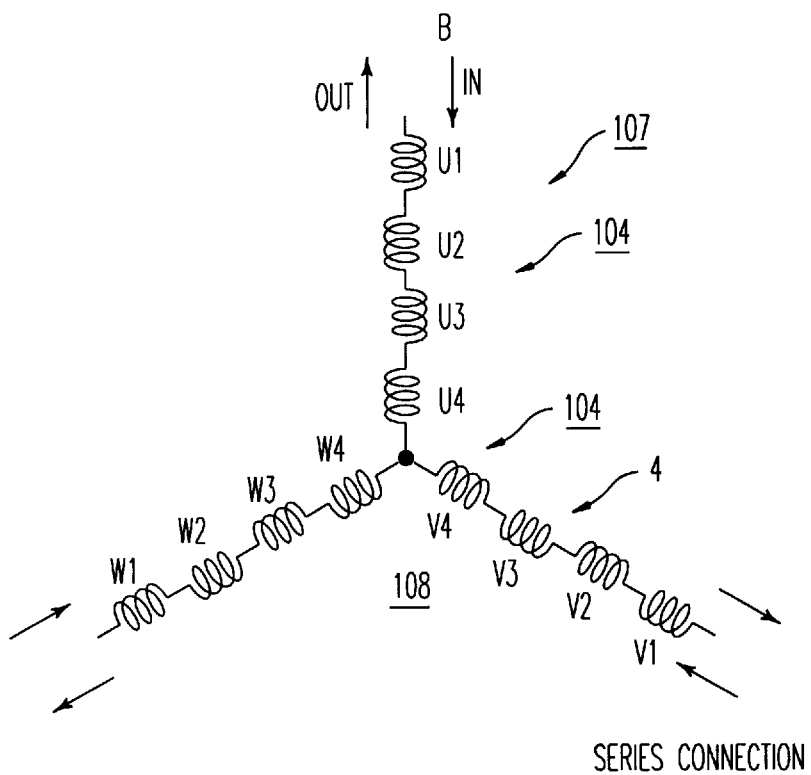
FIGS. 21A and 21B illustrate Y-shaped connection configurations of the DC brushless motor of FIG. 16.
Figure 21B:
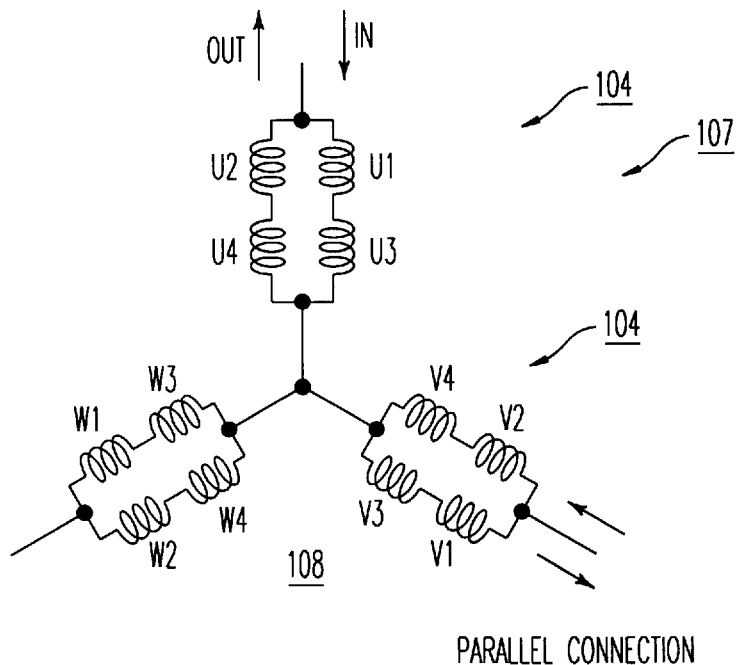

Referring now to FIGS. 20 and 21A–21B to explain how the windings are wound around the respective pole shoes 103a. Viewed from the permanent magnet 101, U1, U2, U3, U4 in the U-phase of the windings 104 are wound alternately in the opposite directions and connected to each other such that a current conducted therethrough causes the T-shaped shoe poles 103a, wound with windings U1, U2, U3, U4, to have opposite magnetic polarities in alternation.

The windings 4 in the three sets of winding groups 7 for U-phase, V-phase and W-phase are connected in a Y-shaped connection configuration generally designated by 108 in FIG. 21A. The windings 104 of the U-phase, V-phase and W-phase are disposed such that the magnetic polarities generated when a current flows into these windings 104 from a common connection point 108a of the Y-shaped connection configuration are opposite between adjacent ones of the windings such as between U1 and W4, between W4 and V1, and so on.

The windings 104 of the U-phase, V-phase and W-phase may be connected with each set of U1–U4, V1–V4 and W1–W4 being connected in series as illustrated in FIG. 21A, or with two sets of two windings in each set being connected in parallel as illustrated in FIG. 21B. Further, the four windings of each set may be connected in parallel, though not shown.

One end of each of three sets of winding groups 107, i.e., U-phase, V-phase, W-phase is connected to the driver circuit 105, which sequentially switches the phases through which a current is conducted, to generate a rotating magnetic field which causes the rotor 102 to rotate.

Two phases are selected for conduction by rotating position detecting signals of the rotating position detector elements 106a, 106b, 106c. FIG. 19 illustrates a state in which the U-phase and V-phase are selected and energized when the rotating position detector elements 106a, 106b, 106c have detected N-pole, S-pole, N-pole, respectively.

Then, a current flows into U1 in a direction indicated by an arrow B in FIG. 21A and flows out of V1, causing the S-polarity to occur at the T-shaped pole shoes 103a associated with U1, U3; the N-polarity to occur at the T-shaped pole shoes 103a associated with U2, U4; the N-polarity to occur at the T-shaped protrusions 103a associated with V1, V3; and the S-polarity to occur at the T-shaped pole shoes 103a associated with V2, V4. Thus, a magnetic repellent force or a magnetic attractive force acts between the stator core 103 and the entire periphery of the permanent magnet 101, forcing the permanent magnet 101 to rotate in the direction indicated by the arrow C in FIG. 19.

Figure 22:
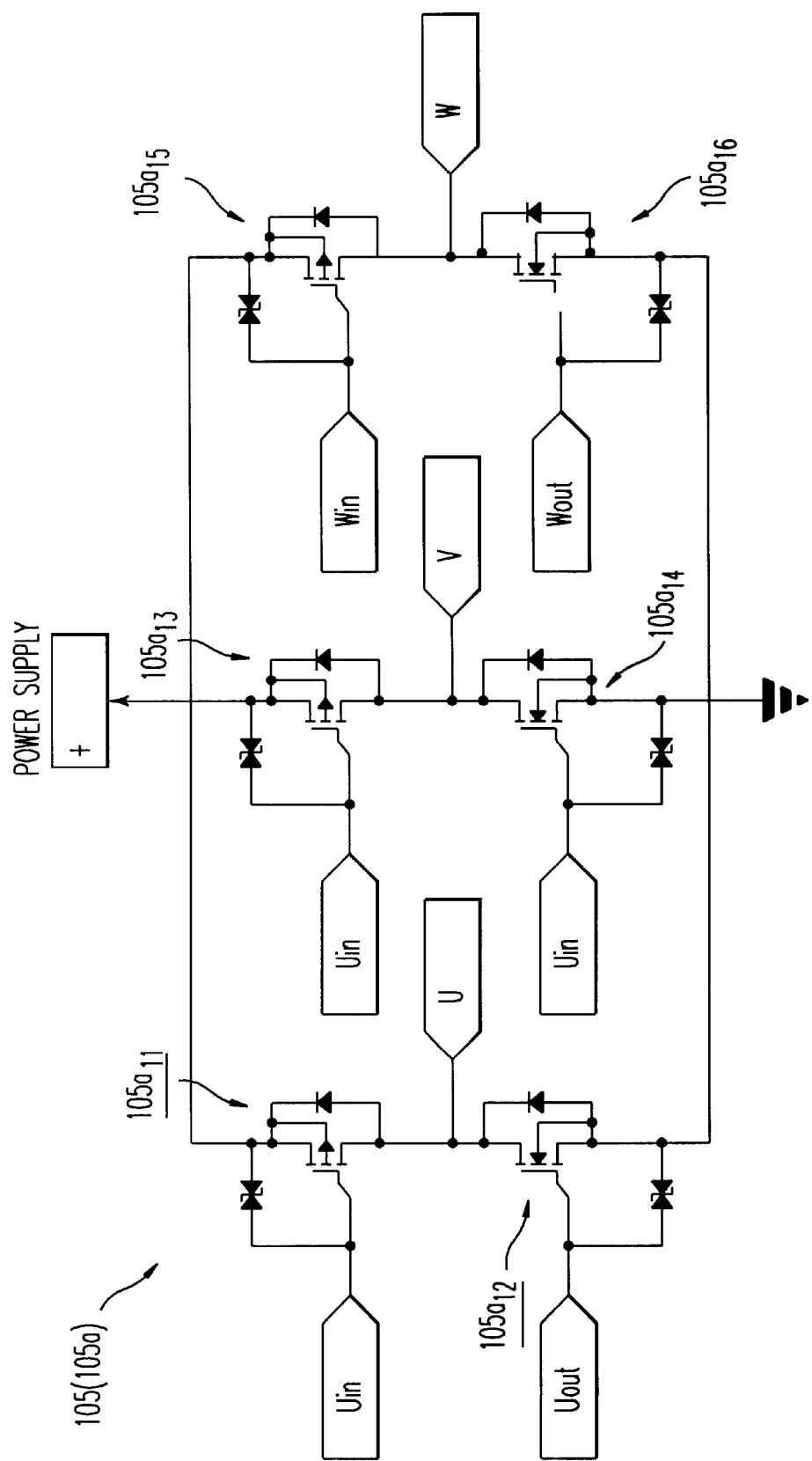
FIG. 22 is a circuit diagram illustrating a two-phase energization driving scheme for the DC brushless motor of FIG. 16.

Referring now to FIG. 22, the above-mentioned two-phase energization driving scheme is implemented by the driving element 105a of the driver circuit 105. The driving element 105a includes six conduction change-over switches $105a_{11}$, $105a_{12}$, $105a_{13}$, $105a_{14}$, $105a_{15}$, $105a_{16}$. Six transistors or field effect transistors may be used for the switches.

Figure 23A:
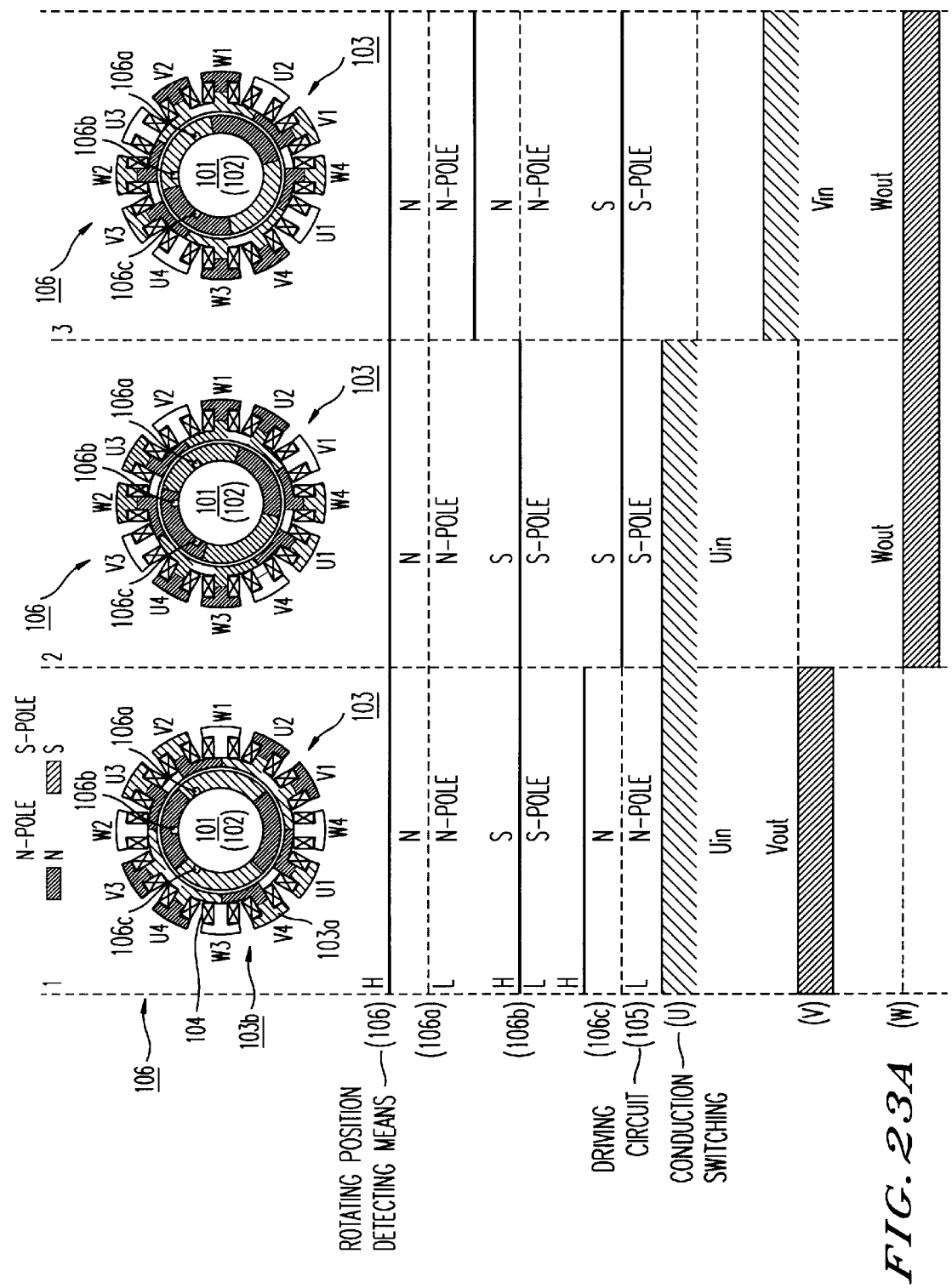
FIG. 23 shows how the conduction is switched to generate a rotating magnetic field in the DC brushless motor of FIG. 16.
Figure 23B:
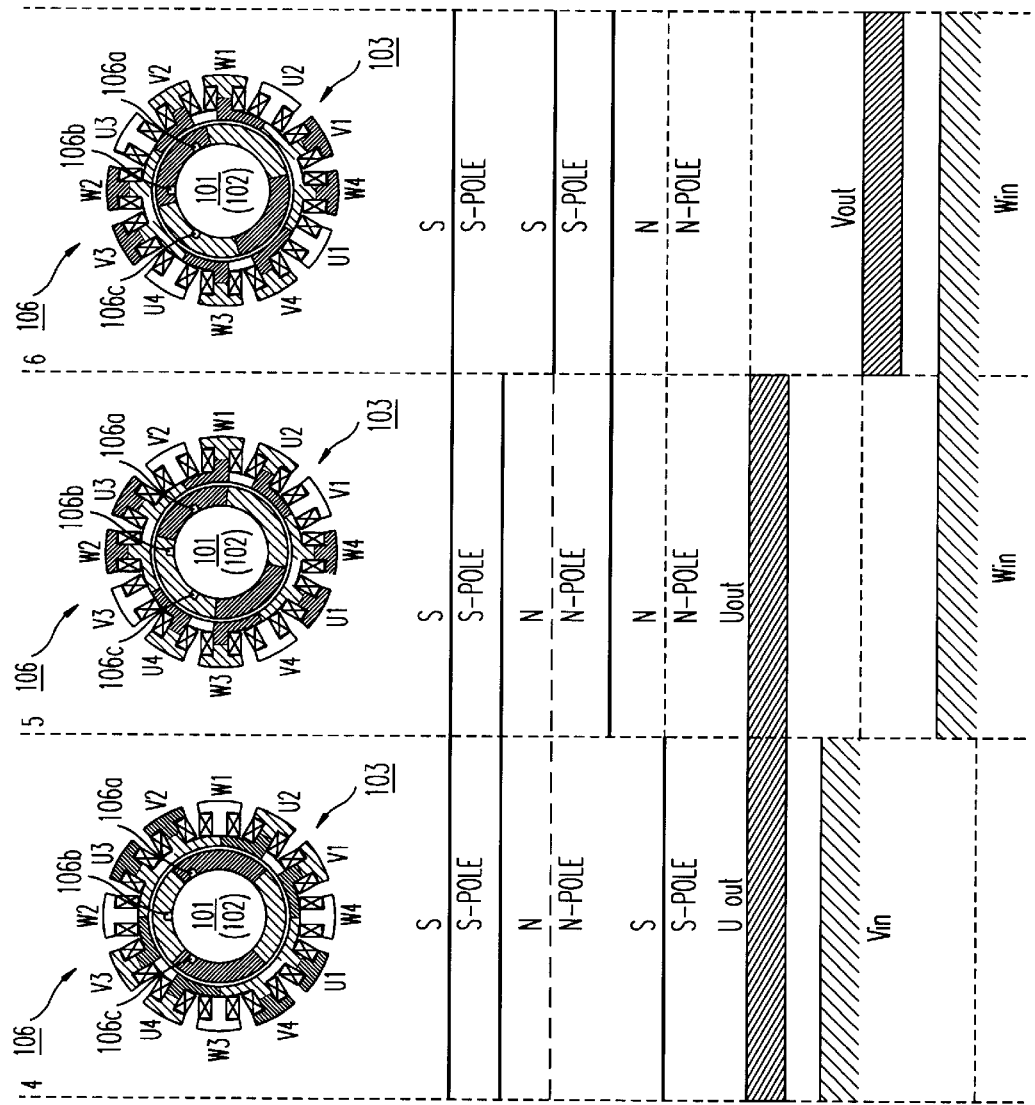

Referring next to FIG. 23, a detailed description will be made on the detection of the rotating position of the permanent magnet 101 made by the three rotating position detector elements 106a, 106b, 106c, the generation of a rotating magnetic field by switching of conduction through the driver circuit 105, and the rotation of the permanent magnet 101 induced by the rotating magnetic field.

Specifically, FIG. 23 illustrates that the phases subjected to conduction are switched every 30° corresponding to one pole shoe of the stator core 103 by the driver circuit 105 to form the energized polarities which generate a rotating magnetic field, causing the permanent magnet 101 to rotate together with the rotor 102 in the counter-clockwise direction.

As the permanent magnet 101 is rotated over an angular distance of 180°, the conduction is switched six times by the driver circuits 105 so that the conduction is switched twelve times during a full rotation of the permanent magnet 101. Thus, magnetic circuits are formed between U1 and V1, between U2 and V2, between U3 and V3, and between U4 and V4 of the windings 104, respectively, with W4, W1, W3 interposed therebetween, so that a magnetic repellent force and a magnetic attractive force act on all of the four poles of the permanent magnet 101 to cause the rotor 102 to rotate in a predetermined direction, thereby making it possible to effectively utilize the entire periphery of the permanent magnet 101 fixed on the rotor 102.

As described above, this embodiment can increase the driving efficiency of the DC brushless motor 100, and reduce the thickness of the stator core 103 by distributing the windings 104 and reducing the number of turns of each winding 104 to contribute to a reduction in size of the DC brushless motor 100.

Since the driver circuit 105 switches the conduction to selectively pass a current to two phases of the windings 104 within three phases of the winding groups 107 to generate a rotating magnetic field which drives the rotor 102 to rotate, it is possible to provide the DC brushless motor 100 that improves a magnetic force utilization factor of the permanent magnet 101.

In the foregoing embodiment, the DC brushless motor 100 includes the permanent magnet 101 having four poles, the stator core 103 having 12 T-shaped pole shoes 103a, 12 open slots 103b, and 12 windings 104. The DC brushless motor 100 in the following alternative configuration can also produce similar effects.

Assume that an alternate DC brushless motor has an even number n of magnetic poles and n windings 104 per phase. The n windings 104 are disposed on the circumference of the stator cores 103 at equal intervals. The windings 104 are divided into a total of three sets of three-phase winding groups 107, wherein adjacent windings are wound in the opposite directions so as to generate opposite magnetic polarities when a current is passed therethrough. The three sets of winding groups 107 are connected in the Y-shaped connection configuration as illustrated in FIG. 21A, and arranged such that when a current flows from the common connection point 108a of the Y-shaped connection configuration 8 into the windings 104, opposite magnetic polarities occur in adjacent windings 104 such as U1 and W4, W4 and V1, or the like.

More specifically, the alternate DC brushless motor 100 includes a permanent magnet 101 having six poles and a stator core 103 having 18 T-shaped pole shoes 103a wound with windings 104; a permanent magnet 101 having eight poles and a stator core 103 having 24 T-shaped pole shoes 103a; or the like.

Next, another embodiment will be described with reference to FIG. 24.

Figure 24:
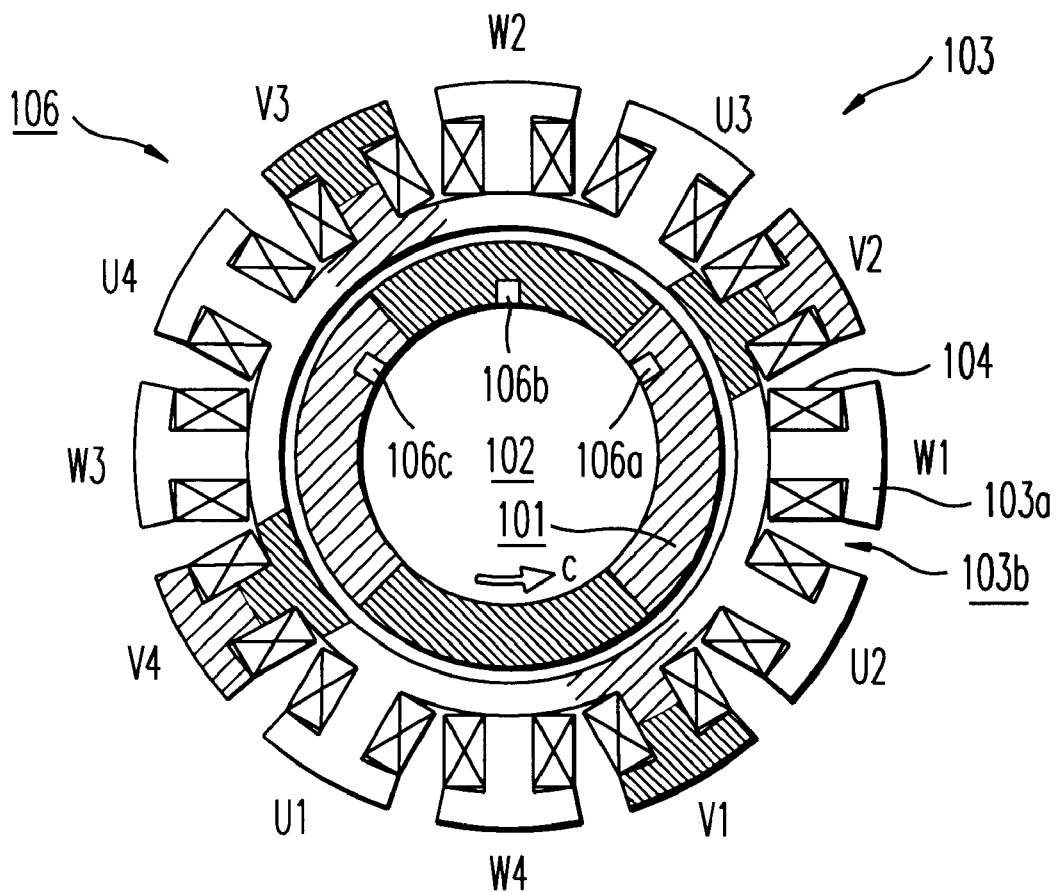
FIG. 24 is a cross-sectional view illustrating a main portion of a DC brushless motor according to another embodiment of the present invention.

Referring specifically to FIG. 24, a stator core 103 is disposed outside of and concentrically with an annular permanent magnet 101 having four magnetized poles in two pairs and fixed on the rotor 2 which. Specifically, the stator core 103 is formed with 12 T-shaped pole shoes 103a made of a ferromagnetic material and radially extending outward, and 12 windings 104 are positioned in open slots 103b between the respective adjacent T-shaped pole shoes 103a. The windings 104 includes three phases designated as a U-phase, a V-phase and a W-phase, where a set of four windings U1, U2, U3, U4 form the U-phase; a set of four windings V1, V2, V3, V4 form the V-phase; and a set of four windings W1, W2, W3, W4 form the W-phase.

The windings 104 in a plurality of winding groups 107 are identical to those in the foregoing embodiment previously described with reference to FIG. 20.

Specifically, U1, U2, U3, U4 in the U-phase of the windings 104 are wound alternately in the opposite directions and connected to each other such that a current conducted therethrough causes the T-shaped shoe poles 103a, wound with windings U1, U2, U3, U4, to have the opposite magnetic polarities in alternation.

Both ends of each of three sets of winding groups 107 of the U-phase, V-phase, W-phase are connected to the driver circuit 105. For detecting a rotating position of the permanent magnet 101 fixed on the rotor 102, the rotating position detector elements 106a, 106b, 106c of the rotating position detecting mechanism 106 are disposed at intervals of 60°. The rotating position detector elements may be electromagnetic transducing elements such as hole elements. The driver circuit 105, responsive to rotating position detecting signals of the rotating position detector elements 106a, 106b, 106c, sequentially switches the phases through which a current is conducted, to generate a rotating magnetic field which causes the rotor 102 to rotate.

FIG. 24 illustrates a state in which the V-phase is selected and energized when the rotating position detector elements 106a, 106b, 106c have detected N-pole, S-pole, N-pole, respectively.

Figure 25:
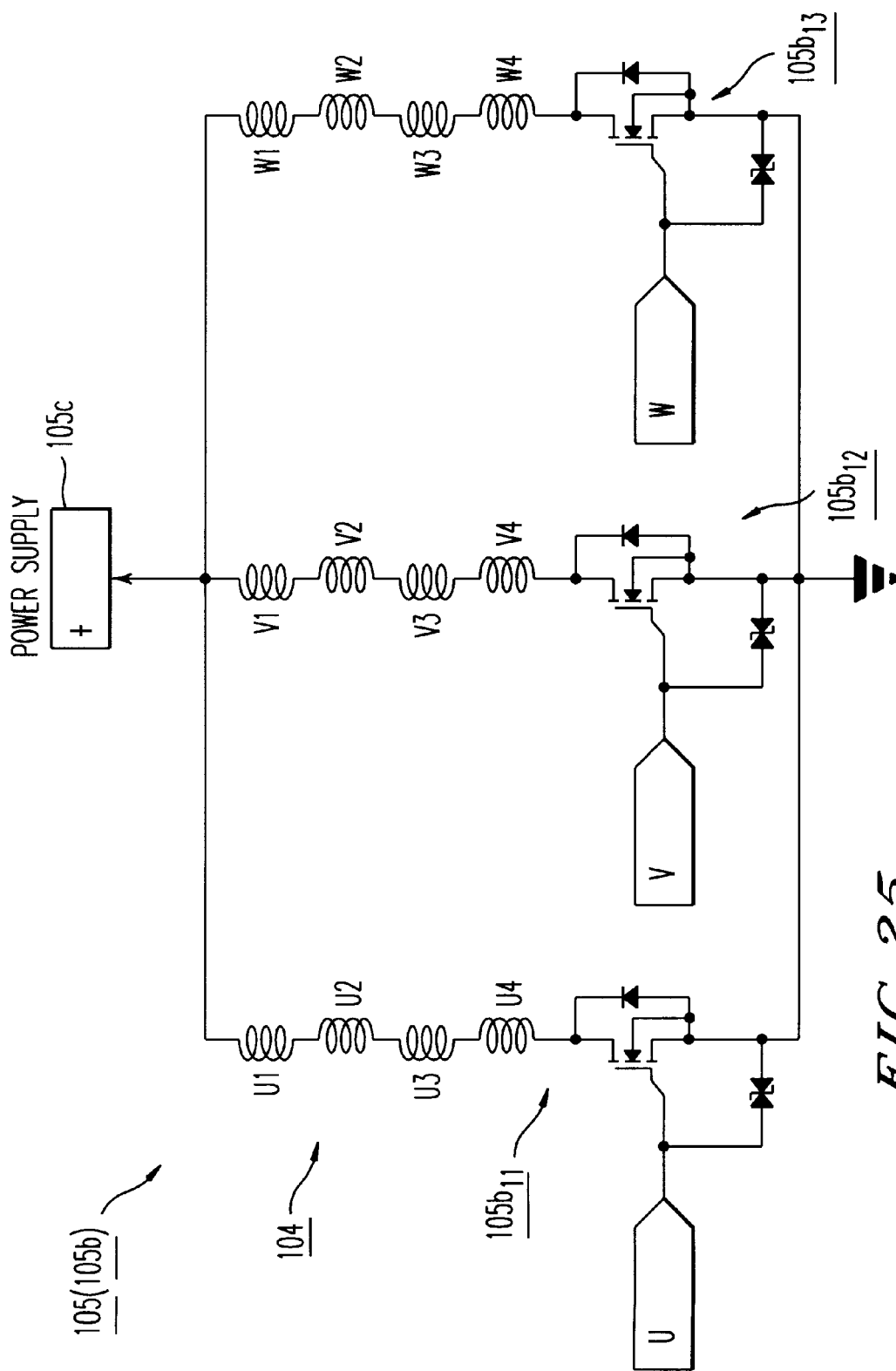
FIG. 25 is a circuit diagram illustrating a one-phase energization driving scheme for the DC brushless motor of FIG. 24.

Then, a current flows into the V-phase, causing the S-polarity to occur at the T-shaped pole shoes 103a associated with V1, V3; and the N-polarity to occur at the T-shaped pole shoes 103a associated with V2, V4. Thus, a magnetic repellent force or a magnetic attractive force acts between the permanent magnet 101 and the stator core 3, forcing the permanent magnet 101 to rotate in the direction indicated by the arrow C in FIG. 24, i.e., in the counter-clockwise direction. Referring now to FIG. 25, the above-mentioned one-phase energization driving scheme is implemented by the driving element 105b of the driver circuit 105. The driving element 105b includes three conduction change-over switches $105b_{11}$, $105b_{12}$, $105b_{13}$ connected to the ground side with respect to the windings 104. Three transistors or field effect transistors may be used for the switches.

When the two-phase energization driving scheme is changed to the one-phase energization driving scheme, the driver circuit 105 only requires three conduction change-over switches, which is one half the number of switches required by the two-phase energization driving scheme. Consequently, the DC brushless motor 100 realizes a reduced switching of conduction switching, a reduced switching loss, a smaller size, a lower cost, and a high loss reduction effect particularly in higher rotational speeds. This DC brushless motor 100 may be employed in a polygon scanner.

The plurality of winding groups 107 in three sets of U-phase, V-phase, W-phase are connected in a Y-shaped connection configuration similar to that illustrated in FIG. 21A, and arranged such that when a current flows from the common connection point 108a of the Y-shaped connection configuration 108 into the windings 104, opposite magnetic polarities occurs in adjacent windings 104 such as U1 and W4, W4 and V1, or the like.

The four windings 104 in each phase may be connected in series, or two sets of two windings 104 may be connected in parallel. Alternatively, the four windings 104 may be connected in parallel, though not shown.

Figure 26:
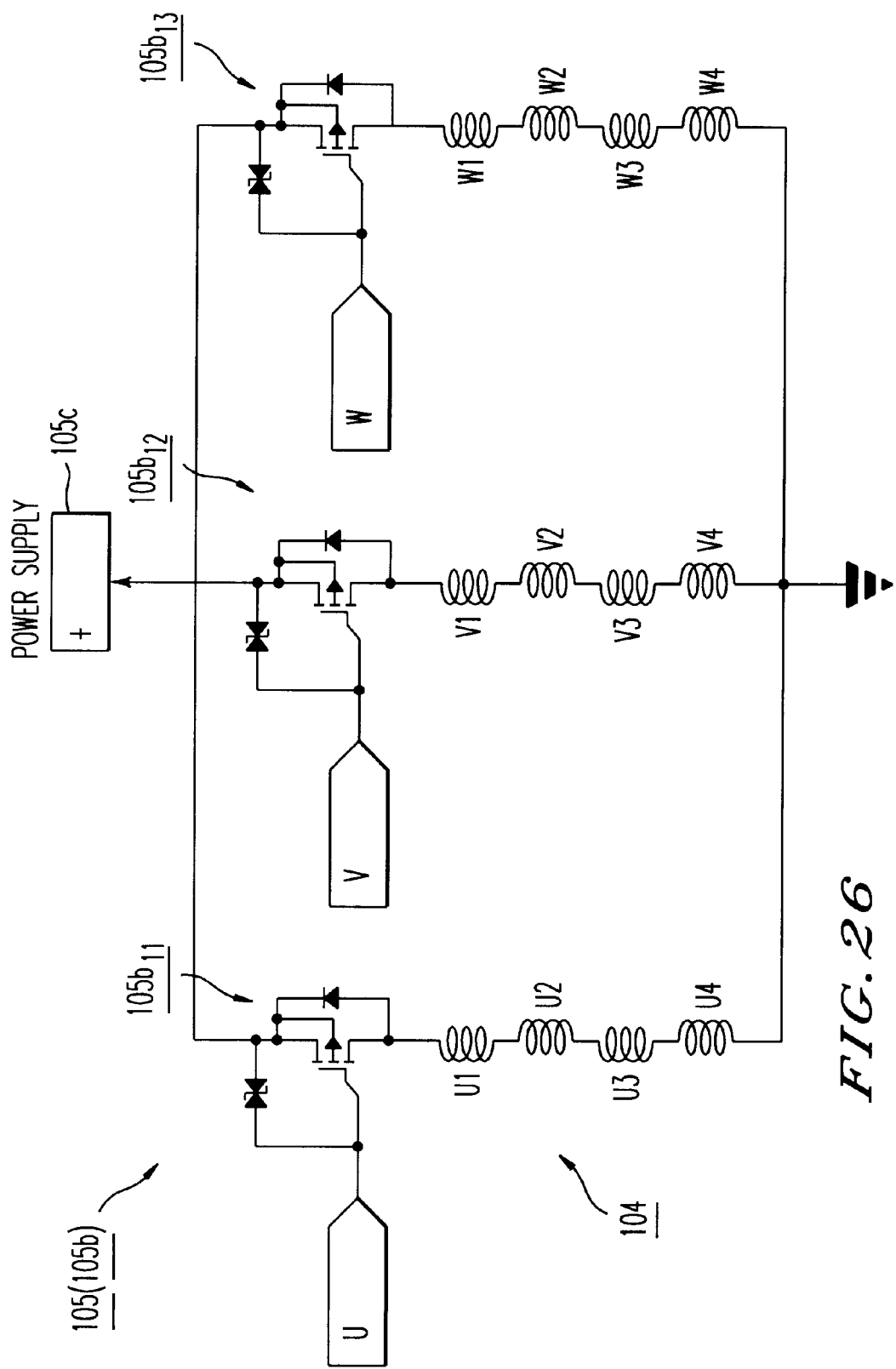
FIG. 26 is a circuit diagram illustrating another one-phase energization driving scheme for the DC brushless motor of FIG. 24.

Referring now to FIG. 26, a description will be made on another form of connection between the conduction change-over switches $105b_{11}$, $105b_{12}$, $105b_{13}$ and the windings 104 when the one-phase energization driving scheme is implement. In the example of FIG. 26, the three conduction change-over switches $105b_{11}$, $105b_{12}$, $105b_{13}$ are connected on a power supply 105c side with respect to the windings 104.

The driving element 105b includes three conduction change-over switches $105b_{11}$, $105b_{12}$, $105b_{13}$. Three transistors or field effect transistors may be used for the switches.

When the two-phase energization driving scheme is changed to the one-phase energization driving scheme, the driver circuit 105 only requires three conduction change-over switches, which is one half the number of switches required by the two-phase energization driving scheme. Consequently, the DC brushless motor 100 realizes a less frequency of conduction switching, a reduced switching loss, a smaller size, a lower cost, and a high loss reduction effect particularly in higher rotational speeds. This DC brushless motor 100 may be employed in a polygon scanner.

The plurality of winding groups 107 in three sets of U-phase, V-phase, W-phase are connected in a Y-shaped connection configuration 108 similar to that illustrated in FIG. 21A, and arranged such that when a current flows from the common connection point 108a of the Y-shaped connection configuration 108 into the windings 104, opposite magnetic polarities occurs in adjacent windings 104 such as U1 and W4, W4 and V1, or the like.

The four windings 104 in each phase may be connected in series, or two sets of two windings 104 may be connected in parallel. Alternatively, the four windings 104 may be connected in parallel, though not shown.

Figure 27A:
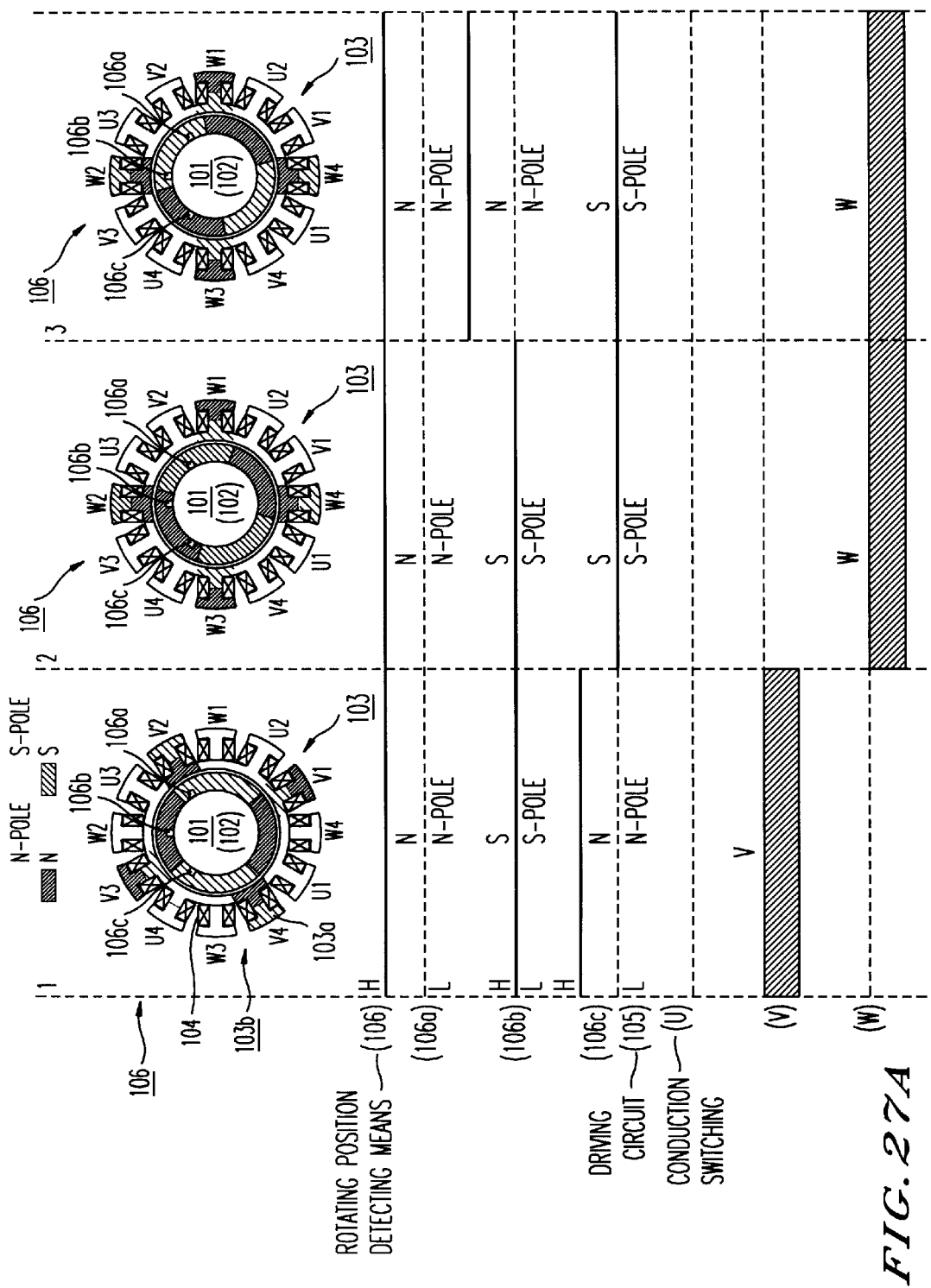
FIG. 27 shows how the conduction is switched to generate a rotating magnetic field in the DC brushless motor of FIG. 24.
Figure 27B:
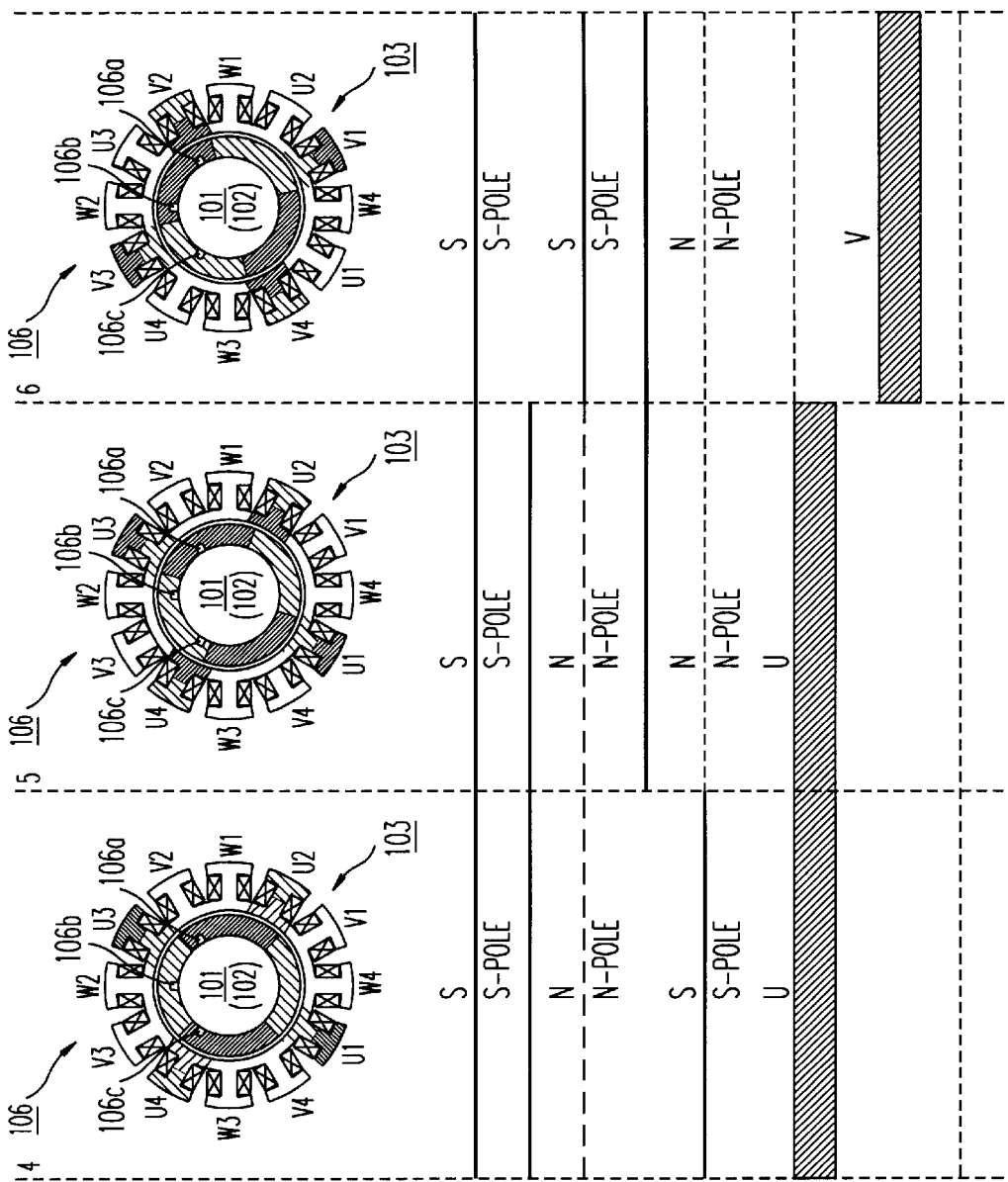

Referring now to FIG. 27, a detailed description will be made on the detection of the rotating position of the permanent magnet 101 made by the three rotating position detector elements 106a, 106b, 106c, the generation of a rotating magnetic field by switching of conduction through the driver circuit 105, and the rotation of the permanent magnet 101 induced by the rotating magnetic field.

Specifically, FIG. 27 shows that the phases subjected to conduction are switched every 60° by the driver circuit 105 to form the energized polarities which generate a rotating magnetic field, causing the permanent magnet 101 to rotate together with the rotor 102 in the counter-clockwise direction.

As the permanent magnet 101 is rotated over an angular distance of 180°, the conduction is switched three times by the driver circuits 105 so that the conduction is switched six times during a full rotation of the permanent magnet 101. In comparison with the foregoing embodiment, the number of times of conduction switching performed during a full rotation of the permanent magnet 101 can be reduced to one half, thereby making it possible to reduce a loss due to the switching. Since the loss caused by the switching is proportional to the number of times of switching, and therefore the conduction switching is performed more frequently in a unit time at a higher rotational speed, the reduction in the number of times of conduction switching results in a reduction in the switching loss. It should be noted that FIG. 27 illustrates that the phases subjected to conduction are switched every 30° similar to the foregoing embodiment for purposes of comparison.

Figure 28:
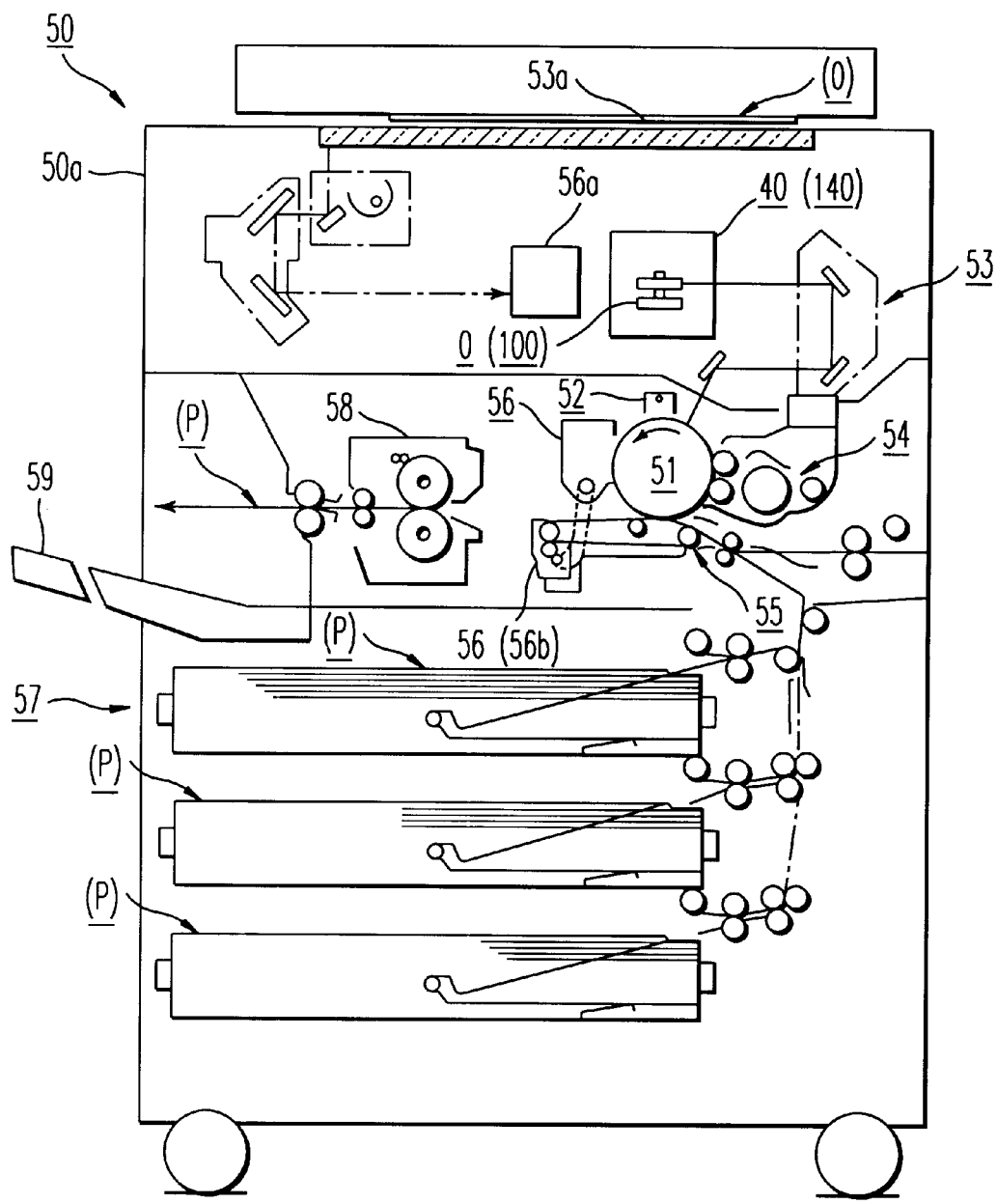
FIG. 28 is a lateral view illustrating an image forming apparatus according to another embodiment of the present invention, which employs a DC brushless motor of the present invention.

Referring next to FIG. 28, a digital copying machine which embodies an image forming apparatus 50 according to the present invention employs the well known electrophotography and contains a photosensitive drum serving as an image carrier 51.

Around the image carrier or photosensitive drum 51, a charging mechanism 52, an exposing mechanism 53, a developing mechanism 54, a transfer mechanism 55, and a cleaning unit 56 including a cleaning mechanism 56a for the image carrier 51 and a cleaning mechanism 56b for the transfer mechanism 55 are disposed for carrying out electrophotographic steps along a rotating direction indicated by an arrow D in FIG. 28.

The exposing mechanism 53 scans a laser beam of a polygon scanner such as the polygon scanner 40 or 140 as mentioned above, which may include the DC brushless motor 0 or 100, based on an image signal read from an original (O) carried on an original carrier 53a on a top surface of a main body 50a of the image forming apparatus 50 by a reading mechanism 53b. The original (O) is written onto the image carrier 51 to form an electrostatic latent image thereon.

The electrostatic latent image formed on the image carrier 51 is developed by the developing mechanism 54 to form a toner image.

The toner image formed on the image carrier 51 is electrostatically transferred by the transfer mechanism 55 onto a transfer sheet (P), on which the toner image is to be transferred, fed from a paper feeding mechanism 57.

The transfer sheet (P), which has the toner image transferred thereon, is transported to a fixing mechanism 58 which fixes the toner image on the transfer sheet (P). Finally, the resulting transfer sheet (P) is discharged to a paper discharge tray 59 and accommodated therein.

With the employment of the DC brushless motor of the present invention, it is possible to provide an image forming apparatus which is capable of reducing an air flow loss, a switching loss and so on at high rotational speeds, improving a rotation driving efficiency, performing a writing operation with reduced power consumption, and forming a small and high quality image.

Obviously, numerous additional modifications and variations of the present invention are possible in light of the above teachings. It is therefore to be understood that within the scope of the appended claims, the present invention may be practiced otherwise than as specifically described herein.

This document claims the priority rights of and is based on the subject matter described in Japanese patent application Nos. JPAP10-149065 filed on May 29, 1998, and JAPA10-203614 filed on Jul. 17, 1998, in the Japanese Patent Office, the entire contents of which are hereby incorporated by reference.

What is claimed is:

1. A direct-current brushless motor, comprising:
a permanent magnet having n magnetized poles, where n is an even number;
a rotor on which said permanent magnet is fixed, said rotor being rotatably held;
a stator core having T-shaped pole shoes corresponding to the magnetized poles of said permanent magnet;
windings fixed on said stator core and comprising a plurality of phases configured to selectively generate magnetic polarities in sequence;
a driver circuit configured to switch conduction to said windings;
rotating position detecting mechanism configured to detect a rotating position of said permanent magnet; and
said windings being divided into a plurality of winding groups configured to generate magnetic polarities in a plurality of said windings so as to produce a magnetic repellent force or a magnetic attractive force between all of the magnetized poles of said permanent magnet and T-shaped pole shoes of said stator core associated with selected phases by said driver circuit based on a rotating position detected by said rotating position detecting mechanism,
wherein said plurality of winding groups include said number n of windings per phase, and are disposed on a circumference at equal intervals, said winding groups corresponding to said phases being connected in a Y-shaped connection configuration,
wherein adjacent windings in each of said phases are wound such that opposite polarities occur in alternation when a current flows therethrough,
wherein a current flowing into said winding groups from a common connection point of said Y-shaped connection configuration causes opposite polarities to occur in adjacent windings, and
wherein the driver circuit selectively conducts windings in two of the three phases of the winding groups and the current flows to the selected two phases in series through the common connection point of the Y-shaped connection configuration to generate a magnetic repellant force and a magnetic attractive force between the entire periphery of the permanent magnet and the stator core forcing the rotor to rotate.

2. A direct-current brushless motor according to claim 1, wherein said stator core includes open slots formed between said T-shaped pole shoes.

3. A direct-current brushless motor according to claim 1, wherein said plurality of winding groups include four windings per phase, and are disposed on a circumference at equal intervals, said winding groups corresponding to said phases being connected in a Y-shaped connection configuration,
adjacent windings in each of said phases are wound such that opposite polarities occur in alternation when a current flows therethrough, and
a current flowing into said winding groups from a common connection point of said Y-shaped connection configuration causes opposite polarities to occur in adjacent windings.

4. A direct-current brushless motor according to claim 1, wherein said rotor has an integrally fixed shaft radially and axially rotatably supported by a radial dynamic pressure air bearing and an axial bearing.

5. A direct-current brushless motor according to claim 1, wherein said permanent magnet fixed on said rotor is disposed in a circumferential direction of said stator core.

6. A direct current brushless motor according to claim 1, wherein said permanent magnet fixed on said rotor is disposed outside said stator core.

7. A direct current brushless motor according to claim 1, wherein said permanent magnet fixed on said rotor is disposed inside said stator core.

8. A direct current brushless motor according to claim 7, wherein said stator core includes a cylindrical inner surface opposite to said permanent magnet.

9. A direct current brushless motor according to claim 7, further comprising an annular member including a ferromagnetic material and disposed along the outer periphery of said windings.

10. A polygon scanner for driving a rotating body having a polygon mirror fixed thereon to scan a writing beam, comprising:
a polygon mirror fixed on a rotor of a direct-current brushless motor, the direct-current brushless motor including:
a permanent magnet having n magnetized poles, where n is an even number;
the rotor on which said permanent magnet is fixed, said rotor being rotatably held;
a stator core having T-shaped pole shoes corresponding to the magnetized poles of said permanent magnet;
windings fixed on said stator core and comprising a plurality of phases configured to selectively generate magnetic polarities in sequence;
a driver circuit configured to switch conduction to said windings;
rotating position detecting mechanism configured to detect a rotating position of said permanent magnet; and
said windings being divided into a plurality of winding groups configured to generate magnetic polarities in a plurality of said windings so as to produce a magnetic repellent force or a magnetic attractive force between all of the magnetized poles of said permanent magnet and T-shaped pole shoes of said stator core associated with selected phases by said driver circuit based on a rotating position detected by said rotating position detecting mechanism,
wherein said plurality of winding groups include said number n of windings per phase, and are disposed on a circumference at equal intervals, said winding groups corresponding to said phases being connected in a Y-shaped connection configuration,
wherein adjacent windings in each of said phases are wound such that opposite polarities occur in alternation when a current flows therethrough, wherein a current flowing into said winding groups from a common connection point of said Y-shaped connection configuration causes opposite polarities to occur in adjacent windings, and wherein the driver circuit selectively conducts windings in two of the three phases of the winding groups and the current flows to the selected two phases in series through the common connection point of the Y-shaped connection configuration to generate a magnetic repellant force and a magnetic attractive force between the entire periphery of the permanent magnet and the stator core forcing the rotor to rotate.

11. A polygon scanner according to claim 10, wherein said stator core includes open slots formed between said T-shaped pole shoes.

12. A polygon scanner according to claim 10, wherein said plurality of winding groups include four windings per phase, and are disposed on a circumference at equal intervals, said winding groups corresponding to said phases being connected in a Y-shaped connection configuration, adjacent windings in each of said phases are wound such that opposite polarities occur in alternation when a current flows therethrough, and a current flowing into said winding groups from a common connection point of said Y-shaped connection configuration causes opposite polarities to occur in adjacent windings.

13. A polygon scanner according to claim 10, wherein said rotor has an integrally fixed shaft radially and axially rotatably supported by a radial dynamic pressure air bearing and an axial bearing.

14. A polygon scanner according to claim 10, wherein said permanent magnet fixed on said rotor is disposed in a circumferential direction of said stator core.

15. A polygon scanner according to claim 10, wherein said permanent magnet fixed on said rotor is disposed outside said stator core.

16. A polygon scanner according to claim 10, wherein said permanent magnet fixed on said rotor is disposed inside said stator core.

17. A polygon scanner according to claim 16, wherein said stator core includes a cylindrical inner surface opposite to said permanent magnet.

18. A polygon scanner according to claim 16, further comprising an annular member including a ferromagnetic material and disposed along the outer periphery of said windings.

19. A direct-current brushless motor, comprising:

a permanent magnet having n magnetized poles, where n is an even number;

a rotor on which said permanent magnet is fixed, said rotor being rotatably held;

a stator core having T-shaped pole shoes corresponding to the magnetized poles of said permanent magnet;

windings fixed on said stator core and comprising a plurality of phases configured to selectively generate magnetic polarities in sequence;

driver circuit means for switching conduction to said windings;

rotating position detecting means for detecting a rotating position of said permanent magnet; and said windings being divided into a plurality of winding groups for generating magnetic polarities in a plurality of said windings so as to produce a magnetic repellent force or a magnetic attractive force between all of the magnetized poles of said permanent magnet and T-shaped pole shoes of said stator core associated with selected phases by said driver circuit means based on a rotating position detected by said rotating position detecting means, wherein said plurality of winding groups include said number n of windings per phase, and are disposed on a circumference at equal intervals, said winding groups corresponding to said phases being connected in a Y-shaped connection configuration, wherein adjacent windings in each of said phases are wound such that opposite polarities occur in alternation when a current flows therethrough, wherein a current flowing into said winding groups from a common connection point of said Y-shaped connection configuration causes opposite polarities to occur in adjacent windings and wherein the driver circuit selectively conducts windings in two of the three phases of the winding groups and the current flows to the selected two phases in series through the common connection point of the Y-shaped connection configuration to generate a magnetic repellant force and a magnetic attractive force between the entire periphery of the permanent magnet and the stator core forcing the rotor to rotate.

20. A direct-current brushless motor according to claim 19, wherein said stator core includes open slots formed between said T-shaped pole shoes.

21. A direct-current brushless motor according to claim 19, wherein said plurality of winding groups include four windings per phase, and are disposed on a circumference at equal intervals, said winding groups corresponding to said phases being connected in a Y-shaped connection configuration, adjacent windings in each of said phases are wound such that opposite polarities occur in alternation when a current flows therethrough, and a current flowing into said winding groups from a common connection point of said Y-shaped connection configuration causes opposite polarities to occur in adjacent windings.

22. A direct-current brushless motor according to claim 19, wherein said rotor has an integrally fixed shaft radially and axially rotatably supported by a radial dynamic pressure air bearing and an axial bearing.

23. A direct-current brushless motor according to claim 19, wherein said permanent magnet fixed on said rotor is disposed in a circumferential direction of said stator core.

24. A direct current brushless motor according to claim 19, wherein said permanent magnet fixed on said rotor is disposed outside said stator core.

25. A direct current brushless motor according to claim 19, wherein said permanent magnet fixed on said rotor is disposed inside said stator core.

26. A direct current brushless motor according to claim 25, wherein said stator core includes a cylindrical inner surface opposite to said permanent magnet.

27. A direct current brushless motor according to claim 26, further comprising an annular member including a ferromagnetic material and disposed along the outer periphery of said windings.

* * * * *